US012660041B2

(12) United States Patent
Maleki et al.

(10) Patent No.: US 12,660,041 B2
(45) Date of Patent: \*Jun. 16, 2026

(54) POWER SAVING SIGNAL CONFIGURATIONS FOR CONNECTED DISCONTINUOUS RECEPTION

(71) Applicant: Telefonaktiebolaget LM Ericsson (publ), Stockholm (SE)

(72) Inventors: Sina Maleki, Malmö (SE); Gang Zou, Lund (SE); Andres Reial, Lomma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,441

(22) Filed: Apr. 12, 2024

(65) Prior Publication Data

US 2024/0260132 A1     Aug. 1, 2024

Related U.S. Application Data

(63) Continuation of application No. 17/421,628, filed as application No. PCT/EP2020/050729 on Jan. 13, 2020, now Pat. No. 12,022,557.

(60) Provisional application No. 62/791,180, filed on Jan. 11, 2019.

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01); *H04W 52/0235* (2013.01)

(58) Field of Classification Search
CPC ............. H04W 76/28; H04W 52/0229; H04W 52/0235; H04W 52/0216; Y02D 30/70
See application file for complete search history.

(56) References Cited

U.S. PATENT DOCUMENTS

| | | | |
|---|---|---|---|
| 2018/0270756 A1 | 9/2018 | Bhattad et al. | |
| 2018/0332655 A1* | 11/2018 | Ang | H04W 52/0216 |
| 2019/0239189 A1* | 8/2019 | Hwang | H04W 52/0216 |

(Continued)

FOREIGN PATENT DOCUMENTS

| | | |
|---|---|---|
| CN | 104205993 A | 12/2014 |
| EP | 3420779 A0 | 11/2018 |

(Continued)

OTHER PUBLICATIONS

International Search Report and Written Opinion dated Jul. 16, 2020 for International Application No. PCT/EP2020/050729 filed Jan. 13, 2020, consisting of 23-pages.

(Continued)

*Primary Examiner* — Alison Slater
(74) *Attorney, Agent, or Firm* — Weisberg I.P. Law, P.A.

(57) ABSTRACT

A method, system and apparatus are disclosed. According to one or more embodiments, a method implemented at a wireless device is provided. The wireless device is configured with a connected discontinuous reception, C-DRX, mode defining an active mode and a non-active mode. The method includes receiving an indication of a go-to-sleep, GTS, signal when in non-active mode, the GTS signal indicating to the wireless device to stay in non-active mode during an upcoming active mode time defined by the wireless device's C-DRX configuration.

16 Claims, 15 Drawing Sheets

(56) References Cited

U.S. PATENT DOCUMENTS

| | | | | |
|---|---|---|---|---|
| 2019/0387572 A1* | 12/2019 | Nam | ...................... | H04W 8/24 |
| 2020/0100179 A1 | 3/2020 | Zhou et al. | | |
| 2021/0119742 A1* | 4/2021 | Wu | ...................... | H04L 5/0023 |

FOREIGN PATENT DOCUMENTS

| | | | |
|---|---|---|---|
| EP | 3627910 A1 | 3/2020 |
| KR | 20140136527 A | 11/2014 |
| KR | 20170141679 A | 12/2017 |
| RU | 2481743 C2 | 5/2013 |
| TW | 201902264 A | 1/2019 |
| WO | 2018174635 A1 | 9/2018 |
| WO | 2018174805 A1 | 9/2018 |
| WO | 2020037319 A1 | 2/2020 |
| WO | 2020102018 A1 | 5/2020 |

OTHER PUBLICATIONS

3GPP TS 38.214 V15.3.0; 3rd Generation Partnership Project; technical Specification Group Radio Access Network; NR; Physical layer procedures for data (Release 15), Sep. 2018, consisting of 96-pages.

3GPP TS 38.213 V15.3.0; 3rd Generation Partnership Project; Technical Specification Group Radio Access Network; NR; Physical layer procedures for control (Release 15), Sep. 2018, consisting of 101-pages.

3GPP TSG-RAN WG2 #99 R2-1708285; Title: eMTC power consumption reduction for paging and connected-mode DRX; Agenda Item: 9.14.9; Source: Ericsson; Document for: Discussion, Decision; Date and Location: Aug. 21-25, 2017, Berlin, Germany, consisting of 8-pages.

3GPP TSG RAN WG1 Meeting #95 R1-1813011; Title UE adaption schemes; Agenda Item: 7.2.9.2.1; Source: Samsung; document for: Discussion and decision; Date and Location: Nov. 12-16, 2018, Spokane, USA, consisting of 11-pages.

3GPP TSG RAN WG1 Meeting #95 R1-1812513; Title: UE Adaption to the traffic and UE power consumption characteristics; Agenda Item: 7.2.9.2.1; Source: Intel Corporation; Document for: Discussion and Decision; Date and Location: Nov. 12-16, 2018, Spokane, USA, consisting of 12-pages.

3GPP TS 38.211 V15.4.0; 3rd Generation Partnership Project; Technical Specification Group Radio Access Network; NR; Physical channels and modulation (Release 15), Dec. 2018, consisting of 96-pages.

3GPP TS 38.212 V15.5.0; 3rd Generation Partnership Project; Technical Specification Group Radio Access Network; NR; Multiplexing and channel coding (Release 15), Dec. 2018, consisting of 101-pages.

Russian Office Action and Search Report with English Summary Translation dated Apr. 11, 2022 for Patent Application No. 2021122711/07 filed Jan. 13, 2022, consisting of 12-pages.

Japanese Office Action and English Summary dated Dec. 2, 2022 for Application No. 2021-539547, consisting of 6 pages.

3GPP TSG-RAN WG1 Meeting #94bis R1-1811283; Title: Triggering Adaption of UE Power Consumption Characteristics; Agenda Item: 7.2.9.2.2; Source: Qualcomm Incorporated; Document for: Discussion/Decision; Location and Date: Chengdu, China, Oct. 8-12, 2018, consisting of 12 pages.

3GPP TSG-RAN WG1 Meeting #95 R1-1813183; Title: triggers of NR UE power saving; Agenda Item: 7.2.9.2.2; Source: Ericsson; Document for: Discussion and Decision; Location and Date: Spokane, USA, Nov. 12-16, 2018, consisting of 5 pages.

3GPP TSG-RAN WG1 Meeting AH-1901 Tdoc R1-1901167; Title: Triggers for NR UE power saving; Agenda Item: 7.2.9.2.2; Source: Ericsson: Document for: Discussion and Decision; Location and Date: Taipei, Taiwan, Jan. 21-25, 2019, consisting of 13 pages.

3GPP TSG-RAN WG2 #101bis R2-1805405; Title: DRX with short on Duration and Wake-up signaling; Agenda Item: 10.3.1.13; Source: Ericsson; Document for: discussion, Decision; Location and Date: Sanya, P.R. China, Apr. 16-20, 2018, consisting of 3 pages.

3GPP TS 38.213 V15.5.0 3rd Generation Partnership Project; Technical Specification Group Radio Access Network; NR; Physical layer procedures for control (Release 15), Mar. 2019, consisting of 104 pages.

3GPP TS 38.214 V15.5.0 3rd Generation Partnership Project; Technical Specification Group Radio Access Network; NR; Physical layer procedures for data (Release 15); Mar. 2019, consisting of 103 pages.

Chinese Office Action with English summary translation dated Nov. 29, 2023 for Patent Application No. 202080020488.8, consisting of 16 pages.

Japanese Notice of Allowance with English machine translation dated Jan. 29, 2024 for Patent Application No. 2021539547, consisting of 8 pages.

Korean Notice of Allowance with English machine translation dated Jan. 29, 2024 for Patent Application No. 1020217025023, consisting of 10 pages.

3GPP TSG RAN WG1 Meeting #92bis R1-1804697; Title: The function scope of wake-up signal for feNB-IoT; Agenda Item: 6.2.7.1.1.1; Source: Intel corporation; Document for: Discussion/Decision; Date and Location: Apr. 16-20, 2018, Sanya, China, consisting of 5 pages.

* cited by examiner

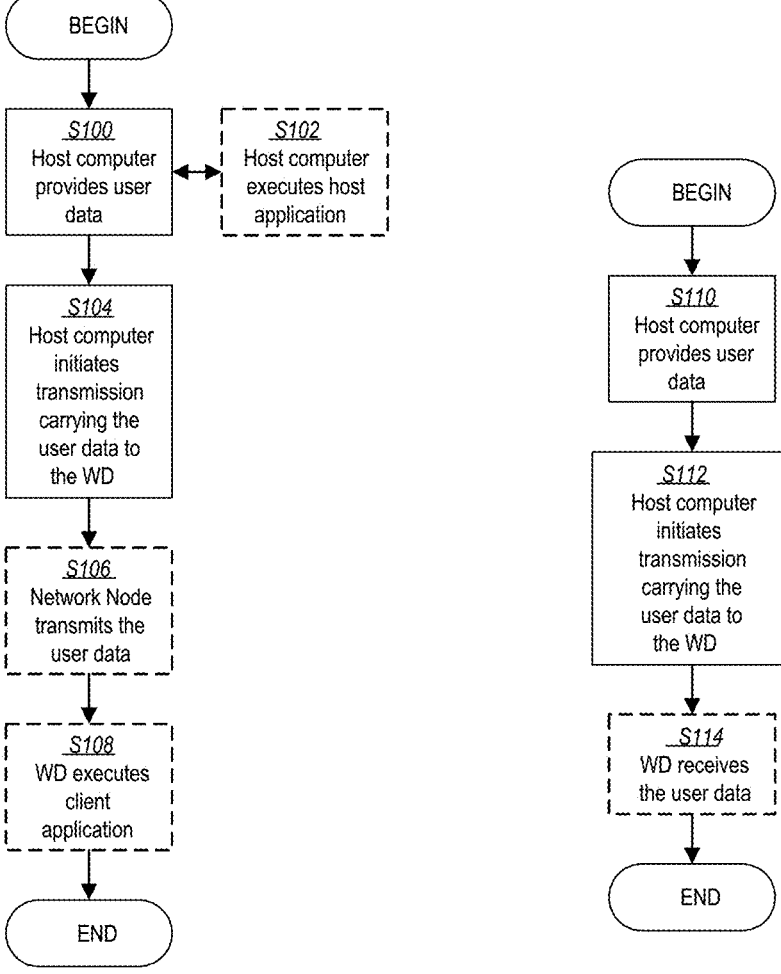
FIG. 6                    FIG. 7

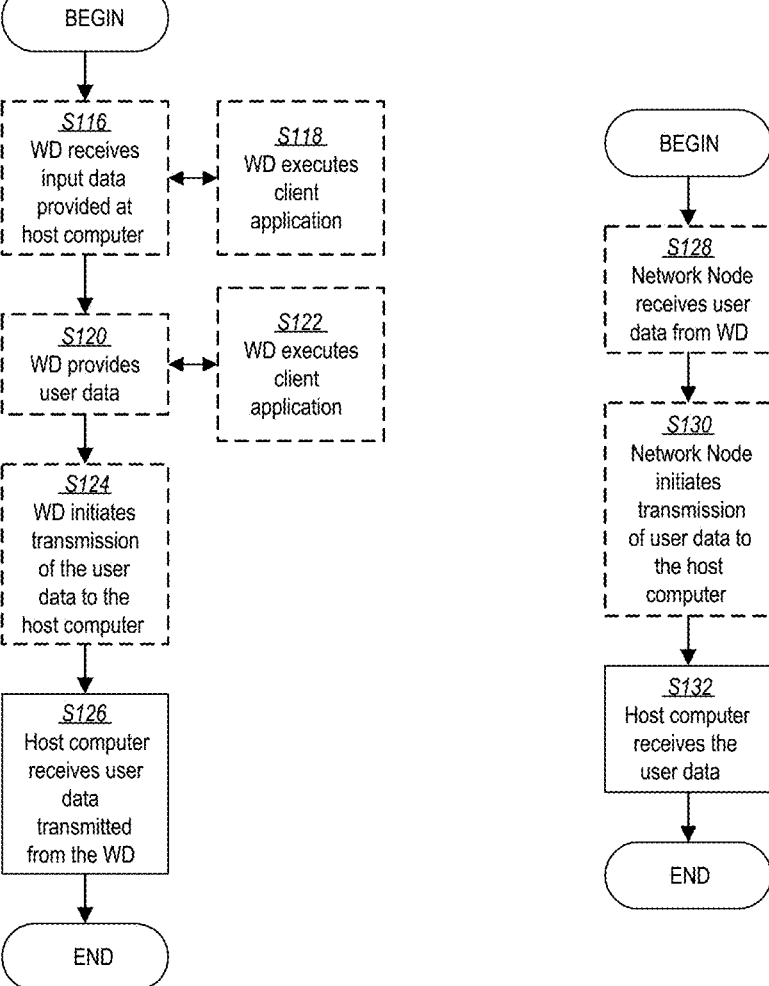
FIG. 8                    FIG. 9

BEGIN

Operate according to an indication of at least one of go-to-sleep (GTS) signaling and wake-up signaling (WUS) where the indication of the at least one of GTS signaling and WUS signaling being associated with at least one ON duration of the wireless device
S136

END

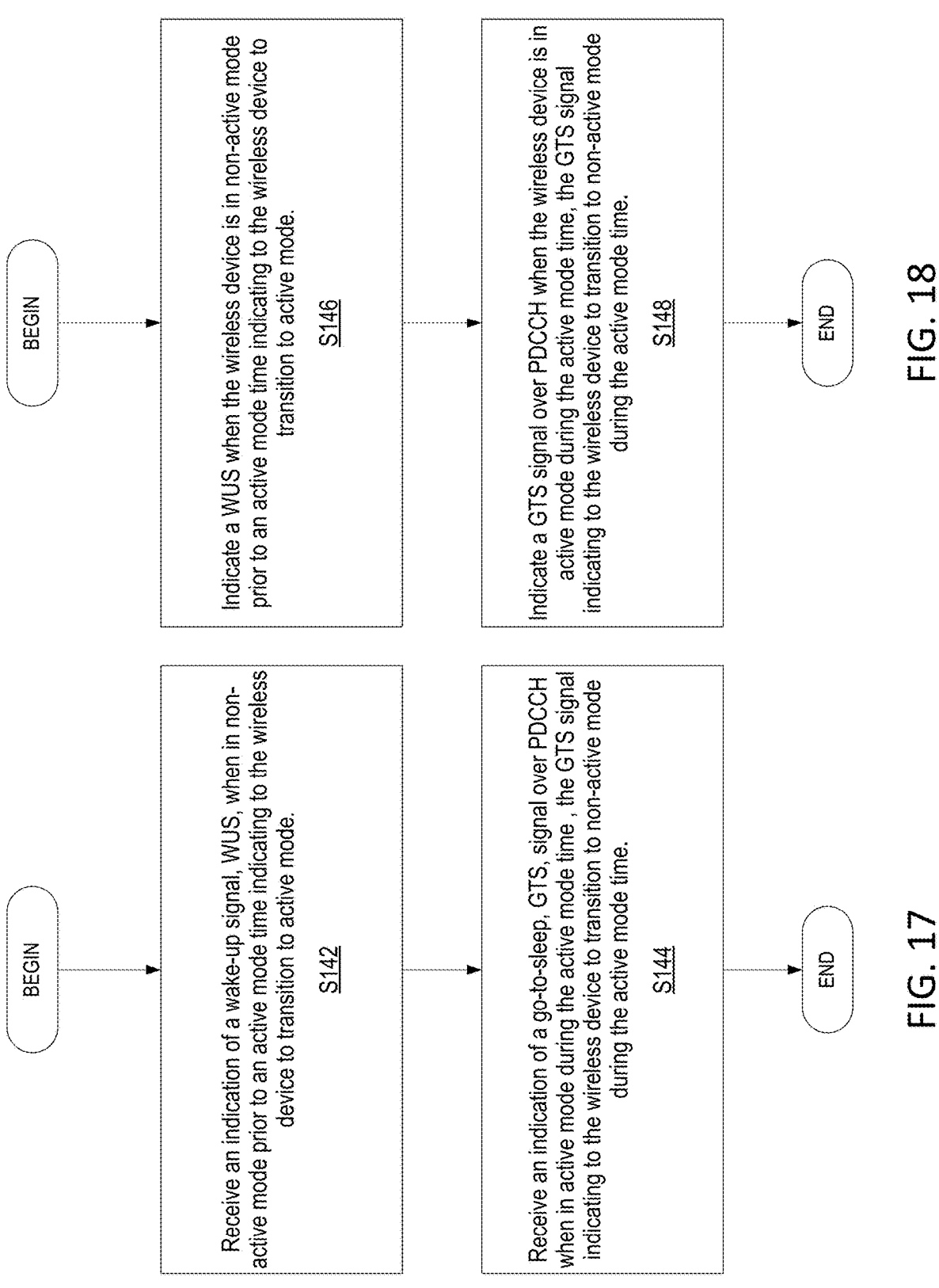

BEGIN

Indicate a WUS when the wireless device is in non-active mode active mode prior to an active mode time indicating to the wireless device to transition to active mode.

S146

Indicate a GTS signal over PDCCH when the wireless device is in active mode during the active mode time, the GTS signal indicating to the wireless device to transition to non-active mode during the active mode time.

S148

END

FIG. 18

BEGIN

Receive an indication of a wake-up signal, WUS, when in non-active mode prior to an active mode time indicating to the wireless device to transition to active mode.

S142

Receive an indication of a go-to-sleep, GTS, signal over PDCCH when in active mode during the active mode time , the GTS signal indicating to the wireless device to transition to non-active mode during the active mode time.

S144

END

POWER SAVING SIGNAL CONFIGURATIONS FOR CONNECTED DISCONTINUOUS RECEPTION

CROSS-REFERENCE TO RELATED APPLICATIONS

This application is a Continuation application of U.S. application Ser. No. 17/421,628, filed Jul. 8, 2021, which is a U.S. National Stage patent application of International Application No.: PCT/EP2020/050729, filed Jan. 13, 2020 entitled "POWER SAVING SIGNAL CONFIGURATIONS FOR CONNECTED DISCONTINUOUS RECEPTION," which claims priority to U.S. Provisional Application No. 62/791,180, filed Jan. 11, 2019, entitled "POWER SAVING SIGNAL CONFIGURATIONS FOR CONNECTED DIS-CONTINUOUS RECEPTION," the entireties of all of which are incorporated herein by reference.

FIELD

The present disclosure relates to wireless communications, and in particular, to indicating go-to-sleep (GTS) signaling and/or wake-up signaling (WUS) to a wireless device.

BACKGROUND

The New radio (NR), also referred to as 5G, standard in Third Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service may require a low latency and high reliability transmission but perhaps for moderate data rates.

One of the existing solutions for low latency data transmission is shorter transmission time intervals. In 3GPP NR, in addition to transmission in a slot, a mini-slot transmission is also allowed to reduce latency. A mini-slot (in NR terminology called Type B scheduling) may consist of any number of 1 to 14 Orthogonal Frequency-Division Multiplexing (OFDM) symbols in the Uplink (UL) and 2, 4 or 7 symbols in the Downlink (DL) (in 3GPP Rel-15). FIG. 1 is an example of a radio resource in NR. It is noted that the concepts of slot and mini-slot are not specific to a specific service meaning that a mini-slot may be used for either eMBB, URLLC, or other services.

Physical Channels

A downlink physical channel corresponds to a set of resource elements carrying information originating from higher layers. Downlink physical channels include:
Physical Downlink Shared Channel, PDSCH.
Physical Broadcast Channel, PBCH.
Physical Downlink Control Channel, PDCCH.
PDSCH is the main physical channel used for unicast downlink data transmission, but also for transmission of RAR (Random Access Response), certain system information blocks, and paging information. Physical Broadcast Channel (PBCH) carries the basic system information, that may be required by the wireless device to access the network and to read remaining system information in System Information Block Type 1 (SIB1). PDCCH is used for transmitting downlink control information (DCI), mainly scheduling decisions, that may be required for reception of PDSCH, and for uplink scheduling grants enabling transmission on Physical Uplink Shared Channel (PUSCH).

An uplink physical channel corresponds to a set of resource elements carrying information originating from higher layers. Uplink physical channels include:
Physical Uplink Shared Channel, PUSCH.
Physical Uplink Control Channel, PUCCH.
Physical Random Access Channel, PRACH.
PUSCH is the uplink counterpart to the PDSCH. PUCCH is used by wireless devices to transmit uplink control information, including Hybrid Automatic Repeat Request (HARQ) acknowledgments, channel state information reports, etc. Physical Random Access Channel (PRACH) is used for random access preamble transmission.

An example contents of a DL Downlink Control Information (DCI) 1-0 is shown below.

In particular, example contents of a DCI format 1_0 with cyclic redundancy check (CRC) scrambled by C-RNTI/CS_RNTI include:
Identifier for DCI formats-1 bits
    The value of this bit field may always be set to 1, indicating a DL DCI format
Frequency domain resource assignment $$\left\lceil \log_2\left(N_{RB}^{DL,BWP}\left(N_{RB}^{DL,BWP}+1\right)/2\right)\right\rceil$$

bits $$N_{RB}^{DL,BWP}$$

is the size of the active DL bandwidth part in case DCI format 1_0 is monitored in the wireless device specific search space and satisfying:
    the total number of different DCI sizes configured to monitor is no more than 4 for the cell, and
    the total number of different DCI sizes with C-RNTI configured to monitor is no more than 3 for the cell;
    otherwise, $$N_{RB}^{DL,BWP}$$

is the size of ControlResourceSet (CORESET) 0.
Time domain resource assignment—4 bits as defined in 3GPP such as in Subclause 5.1.2.1 of 3GPP TS 38.214;
virtual resource block (VRB)-to-physical resource block (PRB) mapping—1 bit, for example, according to 3GPP such as Table 7.3.1.1.2-33 in 3GPP TS 38.214;
Modulation and coding scheme (MCS)—5 bits, for example, as defined in 3GPP such as in Subclause 5.1.3 of 3GPP TS 38.214;
New data indicator—1 bit
Redundancy version—2 bits, for example, as defined in 3GPP such as in Table 7.3.1.1.1-2 of 3GPP TS 38.214;
HARQ process number—4 bits
Downlink assignment index (DAI)—2 bits, for example, as defined in 3GPP such as in Subclause 9.1.3 of 3GPP TS 38.213, as counter DAI;

3

Transmit Power Control (TPC) command for scheduled
PUCCH—2 bits as defined in 3GPP such as in Sub-
clause 7.2.1 of 3GPP TS 38.213;
PUCCH resource indicator—3 bits, for example, as
defined in 3GPP such as in Subclause 9.2.3 of 3GPP TS
38.213;
PDSCH-to-HARQ_feedback timing indicator—3 bits, for
example, as defined in 3GPP such as in Subclause 9.2.3
of 3GPP TS38.213.
A wireless device in NR operates in various Radio
Resource Control (RRC) modes: RRC_IDLE, RRC_INAC-
TIVE, and RRC_CONNECTED mode. One activity for a
wireless device in RRC_CONNECTED mode is monitoring
the PDCCH for potentially scheduled data on a PDSCH/
PUSCH by the network and/or network node.
During this activity, a wireless device may need to receive
and decode received data in all PDCCH occasions/Time-
Frequency (TF) locations/configurations according to a con-
figured search space. The decoding process, also called blind
decoding (BD), entails searching for various Downlink
Control Information (DCI) commands potentially present on
the PDCCH channel and addressed to the wireless device
based on checking the Cyclic Redundancy Check (CRC)
using its Cell Radio Network Temporary Identifier
(C-RNTI) (but also other RNTIs if configured such MCS-
RNTI, CS-RNTI, and various system wide RNTIs). In case
the wireless device finds a DCI command including infor-
mation about allocated data on the PDSCH in the same slot
or in an upcoming slot depending on the K0 configuration,
the wireless device attempts to decode the PDSCH. K0=0
means the data is scheduled in the same slot while K0>0
indicates cross-slot scheduling. K0 may be the time offset (in
slots) between the DCI command and the allocated data on
PDSCH.
Connected-Discontinuous Reception (C-DRX) mecha-
nism enables putting the wireless device in a low-power
mode for a considerably large fraction of the time when no
traffic is transmitted to the wireless device. According to a
configured periodicity, the wireless device "wakes up" to
monitor the PDCCH which may or may not include an
allocation. The period during which the wireless device is
awake and monitoring PDCCH is called On-Duration; it
might also be referred to herein as 'active mode time'. In
case of any DL/UL allocation found during the On-Duration,
the wireless device is kept awake for a period of time
(Inactivity Timer running) during which it constantly moni-
tors PDCCH. If the wireless device is not allocated any data
during this time, the wireless device goes back to discon-
tinuous operation, again waking up occasionally during
On-Durations. C-DRX is depicted in FIG. 2. Typically, the
DRX parameters are configured by RRC and there are some
other DRX parameters including Round Trip Time (RTT)
related, HARQ related, etc. On duration and the time dura-
tion when inactivity timer is running is also generally
referred to as active time.
In general, the following terms are typically associated
with DRX operation:
Active Time: Time related to DRX operation, during
which the MAC entity monitors the PDCCH.
DRX Cycle: Specifies the periodic repetition of the On
Duration followed by a possible period of inactivity (as
illustrated in FIG. 2).
Inactivity Timer: Generally, refers to the number of con-
secutive PDCCH-subframe(s)/slots after the subframe/
slot in which a PDCCH indicates an initial UL, DL or
SL user data transmission for a MAC entity.

MAC entity is the medium access control entity, and there
is one MAC entity per configured cell group, for
example the master cell group and secondary cell
group.
One aspect of DRX is that DRX functionality is config-
ured by RRC, which is typically operating on a slower scale
than MAC or Physical layer. Thus, the DRX parameter
settings, etc. cannot be changed quite adaptively through
RRC configuration, especially if the wireless device has a
mix of traffic types.

SUMMARY

Some embodiments advantageously provide methods,
systems, and apparatuses for indicating go-to-sleep (GTS)
signaling and/or wake-up signaling (WUS) to the wireless
device.
The disclosure provides for power saving signals mecha-
nisms and their underlying configurations for 3GPP New
Radio (NR) wireless devices utilizing the trade-off between
the requirements of the GTS and WUS, as well as channel
conditions. Particularly, the following embodiments may be
considered.
Embodiment 1: GTS before ON duration. A GTS, par-
ticularly a physical downlink control channel
(PDCCH) based one is sent to the wireless device
before an ON duration, and the wireless device skips
the upcoming ON duration or a number of upcoming
ON durations.
Embodiment 2a: Joint WUS and GTS for one ON dura-
tion: In this case, the network and/or network node can
determine to send either a WUS or GTS before an ON
duration of the wireless device. If the situation has
changed, e.g., information has to be delivered (in case
of GTS before ON duration) or the delivery of infor-
mation is finished (in case of WUS before ON dura-
tion), the opposite signal is sent to the wireless device.
Embodiment 2b: Joint WUS and GTS for multiple ON
durations. In this case, the network and/or network
node can dynamically decide to send either a long-term
WUS or GTS before ON duration. If the situation has
changed, e.g., information has to be delivered (in case
of previous GTS before ON duration) or the delivery of
information is finished (in case of previous WUS
before ON duration), the opposite signal is sent to the
wireless device.
Embodiment 3: WUS/GTS resources. The disclosure pro-
vides some mechanisms to assign resources for the
WUS and GTS particularly before the ON duration.
Embodiment 4: Network and/or network node makes the
decision to configure the wireless device for either
WUS or GTS operation. Here, the disclosure describes
some examples and mechanisms on how the network
and/or network node can use the inherent trade-offs
between WUS and GTS in different situations to use
them efficiently for both power saving and keeping the
network performance intact.
According to one aspect of the present disclosure there is
provided a method implemented at a wireless device con-
figured with a connected discontinuous reception, C-DRX,
mode defining an active mode and a non-active mode. The
method comprises receiving an indication of a go-to-sleep,
GTS, signal when in non-active mode, the GTS signal
indicating to the wireless device to stay in non-active mode
during an upcoming active mode time defined by the wire-
less device's C-DRX configuration.

According to another aspect of the present disclosure there is provided a wireless device configured with a connected discontinuous reception, C-DRX, mode defining a an active mode and a non-active mode. The wireless device configured to receive an indication of a go-to-sleep, GTS, signal when in non-active mode, the GTS signal indicating to the wireless device to stay in non-active mode during an upcoming active mode time defined by the wireless device's C-DRX configuration.

According to another aspect there is provided a method implemented at a network node configured to communicate with a wireless device configured with a connected discontinuous reception, C-DRX, mode defining an active mode and a non-active mode. The method comprises indicating a go-to-sleep, GTS, signal to the wireless device when the wireless device is in non-active mode, the GTS signal indicating to the wireless device to stay in non-active mode during an upcoming active mode time defined by the wireless device's C-DRX configuration.

According to another aspect there is provided a network node configured to communicate with a wireless device configured with a connected discontinuous reception, C-DRX, operation mode defining an active mode and a non-active mode. The network node is configured to indicate a go-to-sleep, GTS, signal to the wireless device when the wireless device is in non-active mode, the GTS signal indicating to the wireless device to stay in non-active mode during an upcoming active mode time defined by the wireless device's C-DRX configuration.

According to another aspect there is provided a method implemented at a wireless device configured with a connected discontinuous reception, C-DRX, mode defining an active mode and a non-active mode. The method comprises receiving an assignment of at least one control resource set, CORESET, associated with at least one search space to monitor for an indication of a power-saving signal outside active mode.

According to another aspect there is provided a wireless device configured with a connected discontinuous reception, C-DRX, mode defining an active mode and a non-active mode. The wireless device is configured to receive an assignment of at least one control resource set, CORESET, associated with at least one search space to monitor for an indication of a power-saving signal outside active mode.

According to another aspect there is provided a method implemented at a network node configured to communicate with a wireless device configured with a connected discontinuous reception, C-DRX, mode defining an active mode and a non-active mode. The method comprises configuring the wireless device with at least one control resource set, CORESET, associated with at least one search space to monitor for an indication of a power-saving signal outside active mode.

According to another aspect there is provided a network node configured to communicate with a wireless device configured with a connected discontinuous reception, C-DRX, mode defining an active mode and a non-active mode. The network node is configured to assign to the wireless device at least one control resource set, CORESET, associated with at least one search space to monitor for an indication of a power-saving signal outside active mode.

According to another aspect there is provided a method implemented at a wireless device configured with a connected discontinuous reception, C-DRX, mode defining an active mode and a non-active mode. The method comprises receiving an indication of a go-to-sleep, GTS, signal over a physical downlink control channel, PDCCH, when in active mode during an active mode time defined by the wireless device's C-DRX configuration, the GTS signal indicating to the wireless device to transition to non-active mode during the active mode time.

According to another aspect there is provided a wireless device configured with a connected discontinuous reception, C-DRX, mode defining an active mode and a non-active mode. The wireless device is configured to receive an indication of a go-to-sleep, GTS, signal over a physical downlink control channel, PDCCH, when in active mode during an active mode time defined by the wireless device's C-DRX configuration, the GTS signal indicating to the wireless device to transition to non-active mode during the active mode time.

According to another aspect a method implemented at a network node configured to communicate with a wireless device configured with a connected discontinuous reception, C-DRX, mode defining an active mode and a non-active mode. The method comprises indicating a go-to-sleep, GTS, signal over a physical downlink control channel, PDCCH, to the wireless device when the wireless device is in an active mode during an active mode time defined by the device's C-DRX configuration, the GTS signal indicating to the wireless device to transition to non-active mode during the active mode time.

According to another aspect there is provided a network node configured to communicate with a wireless device configured with a connected discontinuous reception, C-DRX, mode defining an active mode and a non-active mode. The network node is configured to indicate a go-to-sleep, GTS, signal over a physical downlink control channel, PDCCH, to the wireless device when the wireless device is in an active mode during an active mode time defined by the device's C-DRX configuration, the GTS signal indicating to the wireless device to transition to non-active mode during the active mode time.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

7

Figure 10:
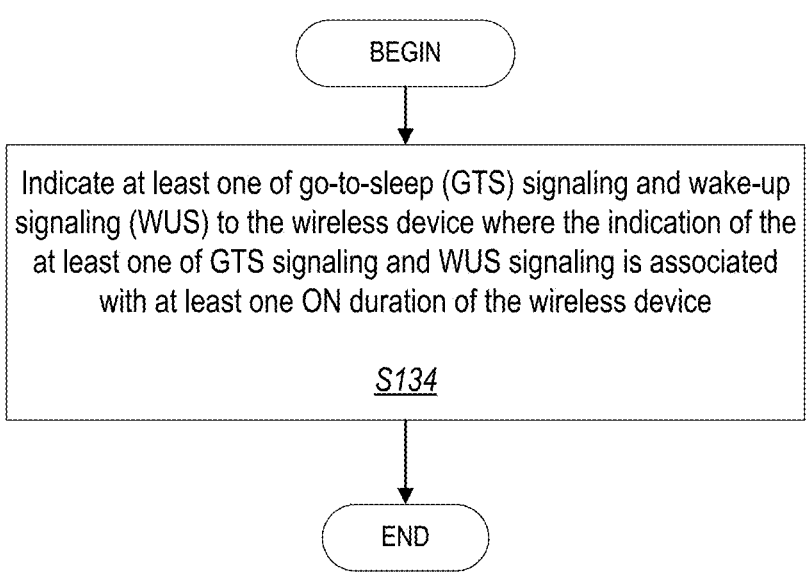
Figure 11:
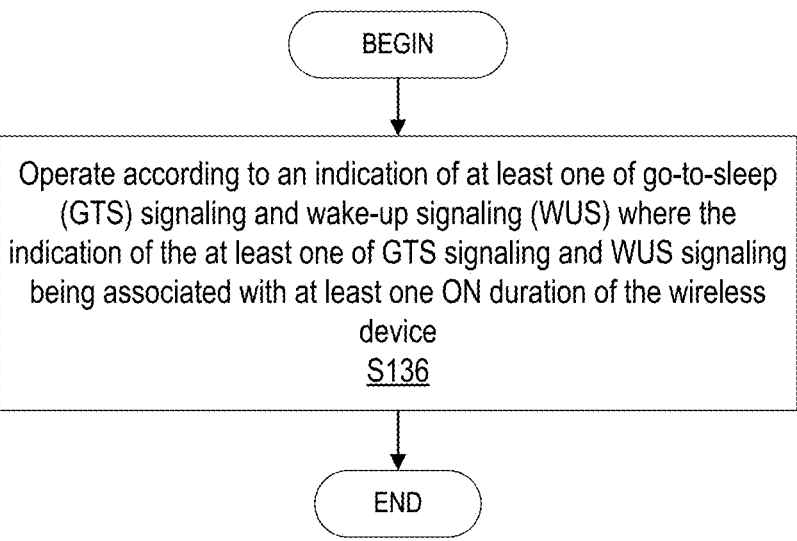
Figure 12:
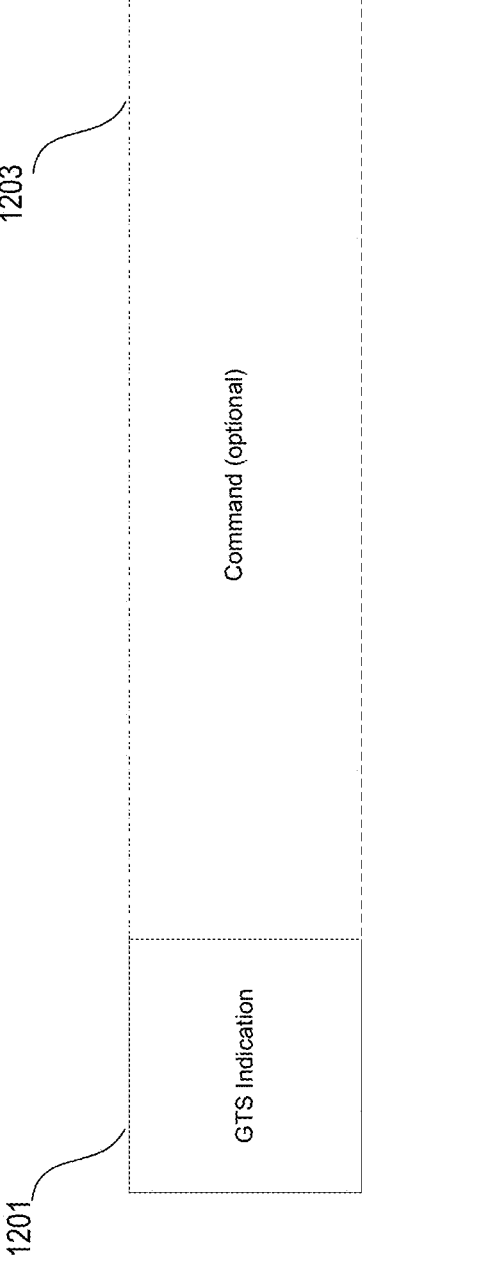
Figure 13:
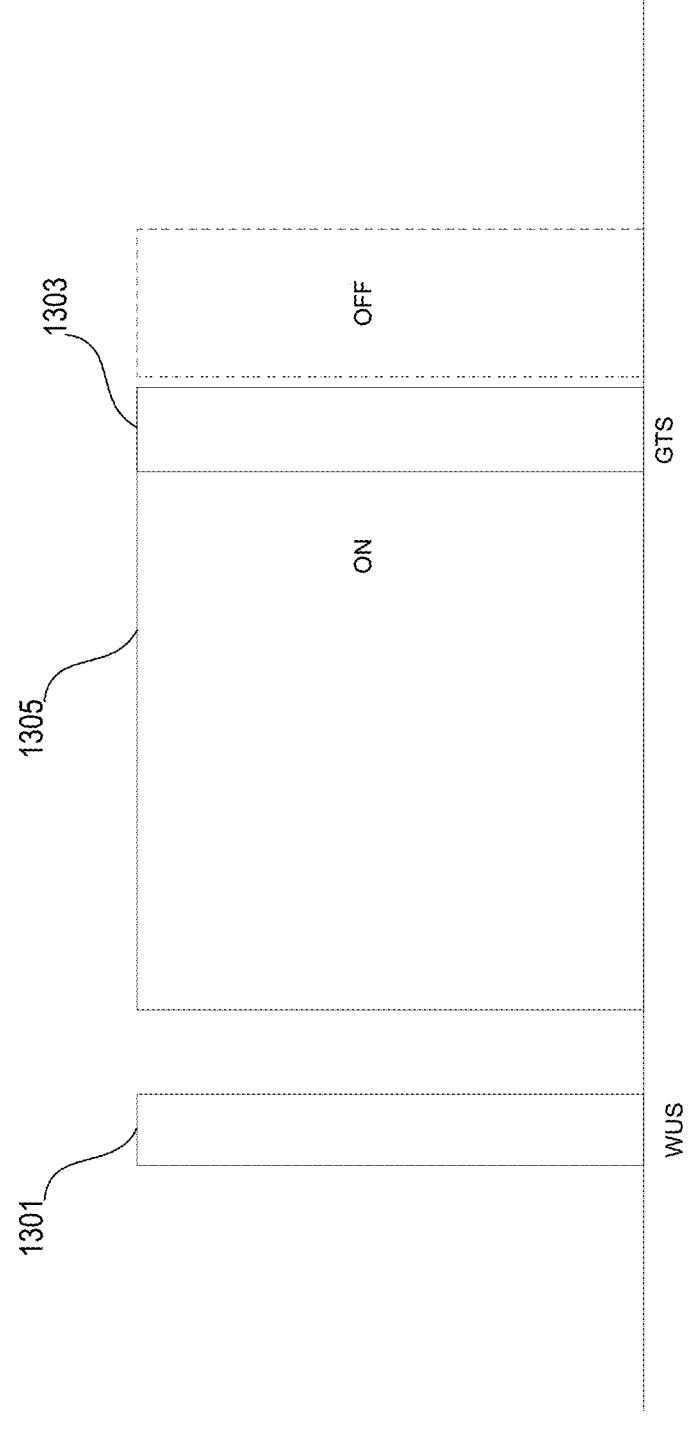
Figure 14:
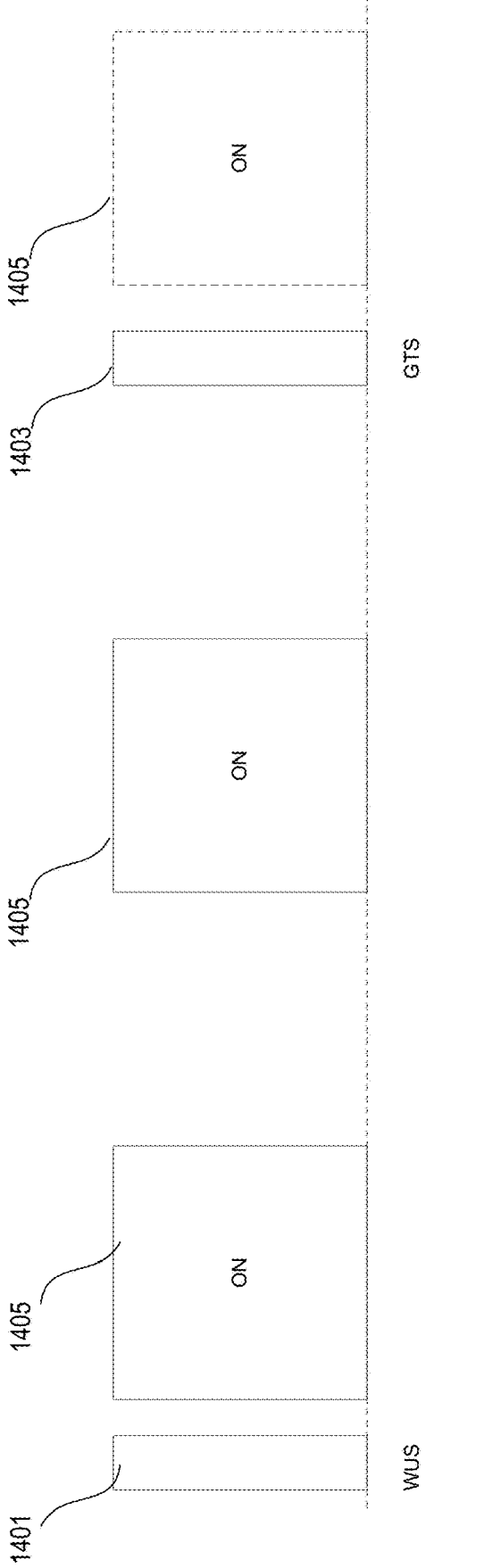
Figures 15, 16:
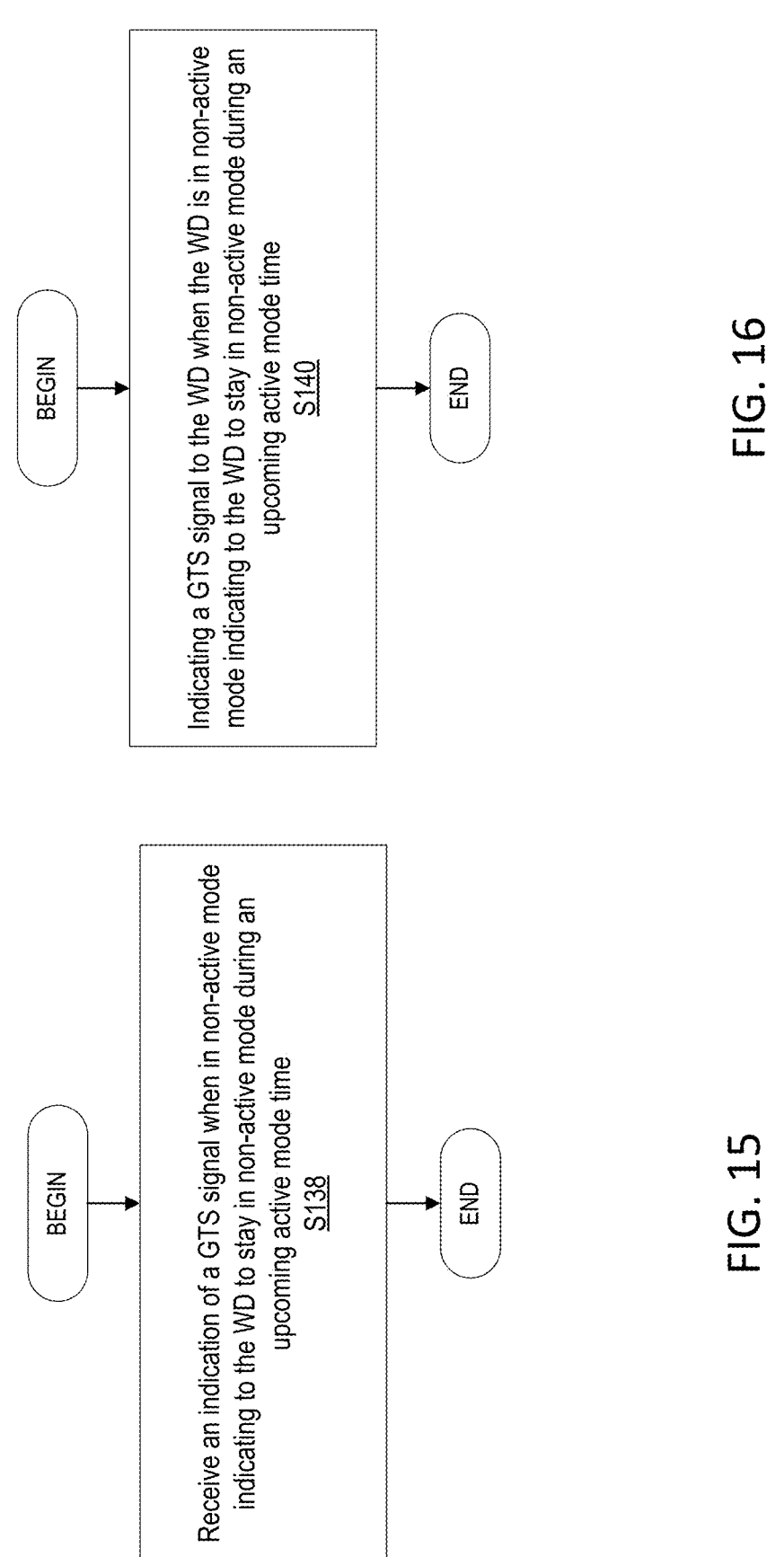
Figures 19, 20:
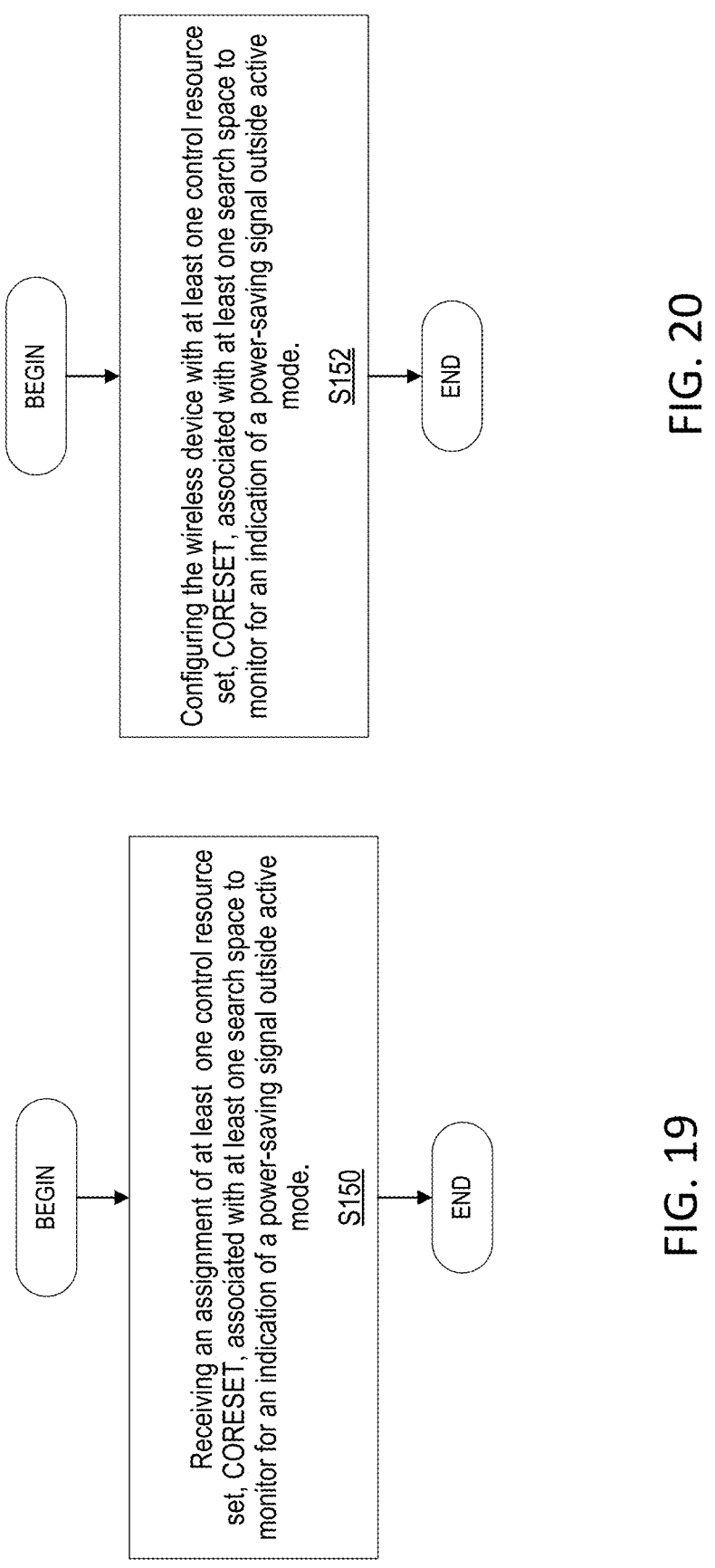

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

FIG. 10 is a flowchart of an exemplary process in a network node according to some embodiments of the present disclosure;

FIG. 11 is a flowchart of an exemplary process in a wireless device according to some embodiments of the present disclosure;

FIG. 12 is a diagram of GTS-DCI payload according to some embodiments of the disclosure;

FIG. 13 is a diagram of example 2a according to some embodiments of the disclosure;

FIG. 14 is a diagram of example 2b according to some embodiments of the disclosure;

FIG. 15 is a flowchart of an exemplary process performed at a wireless device according to some embodiments of the present disclosure;

FIG. 16 is a flowchart of an exemplary process performed at a network node according to some embodiments of the present disclosure;

FIG. 17 is a flowchart of an exemplary process performed at a wireless device according to some embodiments of the present disclosure;

FIG. 18 is a flowchart of an exemplary process performed at a network node according to some embodiments of the present disclosure;

FIG. 19 is a flowchart an exemplary process performed at a wireless device according to some embodiments of the present disclosure; and FIG. 20 is flowchart of an exemplary process performed at a network node according to some embodiments of the present disclosure.

DETAILED DESCRIPTION

As discussed above, existing DRX operations such as the C-DRX operation is configured by RRC. In existing 3GPP specifications, the network node and/or network (NW) has the possibility to provide a Go-To-Sleep (GTS) signal called Medium Access Control (MAC) Control Element (CE) DRX-Command in the PDSCH in order to put the wireless device back in C-DRX mode after the transmission is ended. As such, the network node and/or network node manages and/or causes the transition of the wireless device to the sleep mode faster than the time it would have taken the Inactivity Timer to expire in which expiration of the timer causes the Wireless device power consumption may be an important metric that may need to be enhanced. In general, significant power can be spent on monitoring the PDCCH in LTE based on one DRX setting from LTE field logs. The situation can be similar in NR if similar DRX setting with traffic modeling is utilized, as the wireless device may need to perform blind detection in its configured search space to identify whether there is a PDCCH sent to it, and act accordingly. Techniques that can reduce unnecessary PDCCH monitoring or that allow the wireless device to go to sleep or wake-up only when required can be beneficial.

The present disclosure is directed to providing power saving mechanisms before and after the ON duration of C-DRX cycles which efficiently delivers wireless device power savings while also do not add additional burden on the network node by increasing latency and lowering the throughput.

The instant disclosure at least in part helps fulfill these needs by providing a wireless device with efficient mechanisms to save power while keeping the network and/or network node in charge to help ensure that the network performance is not impacted. Provisioning a GTS may help the wireless device to more reliably keep sleeping and thus save additional energy. Suitable selection of WUS vs GTS configurations allows a favorable trade-off between wireless device power saving, power saving signal detection performance, and network resource utilization.

Figure 1:
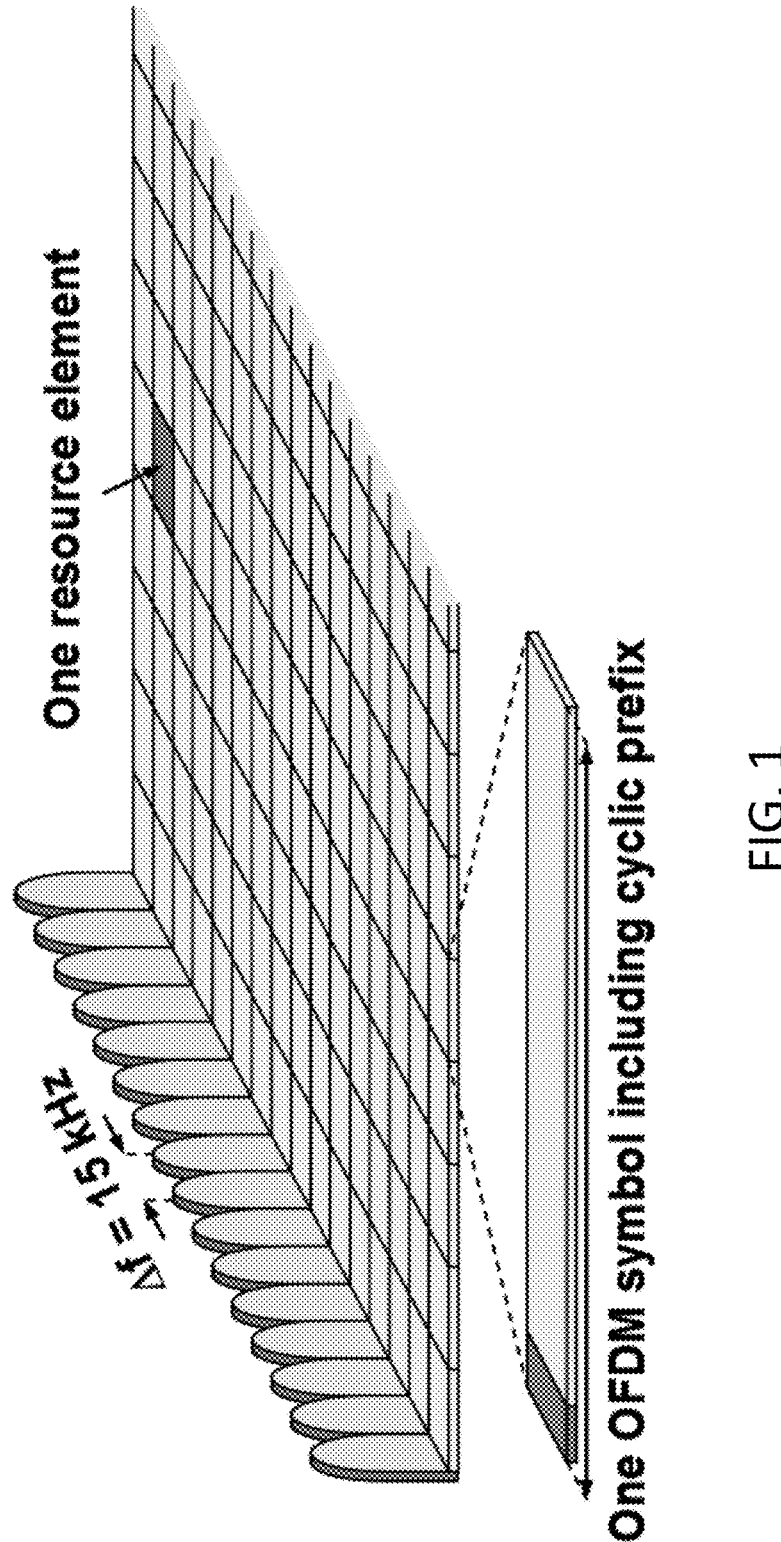
FIG. 1 is a diagram of a radio resource in 3GPP NR.
Figure 2:
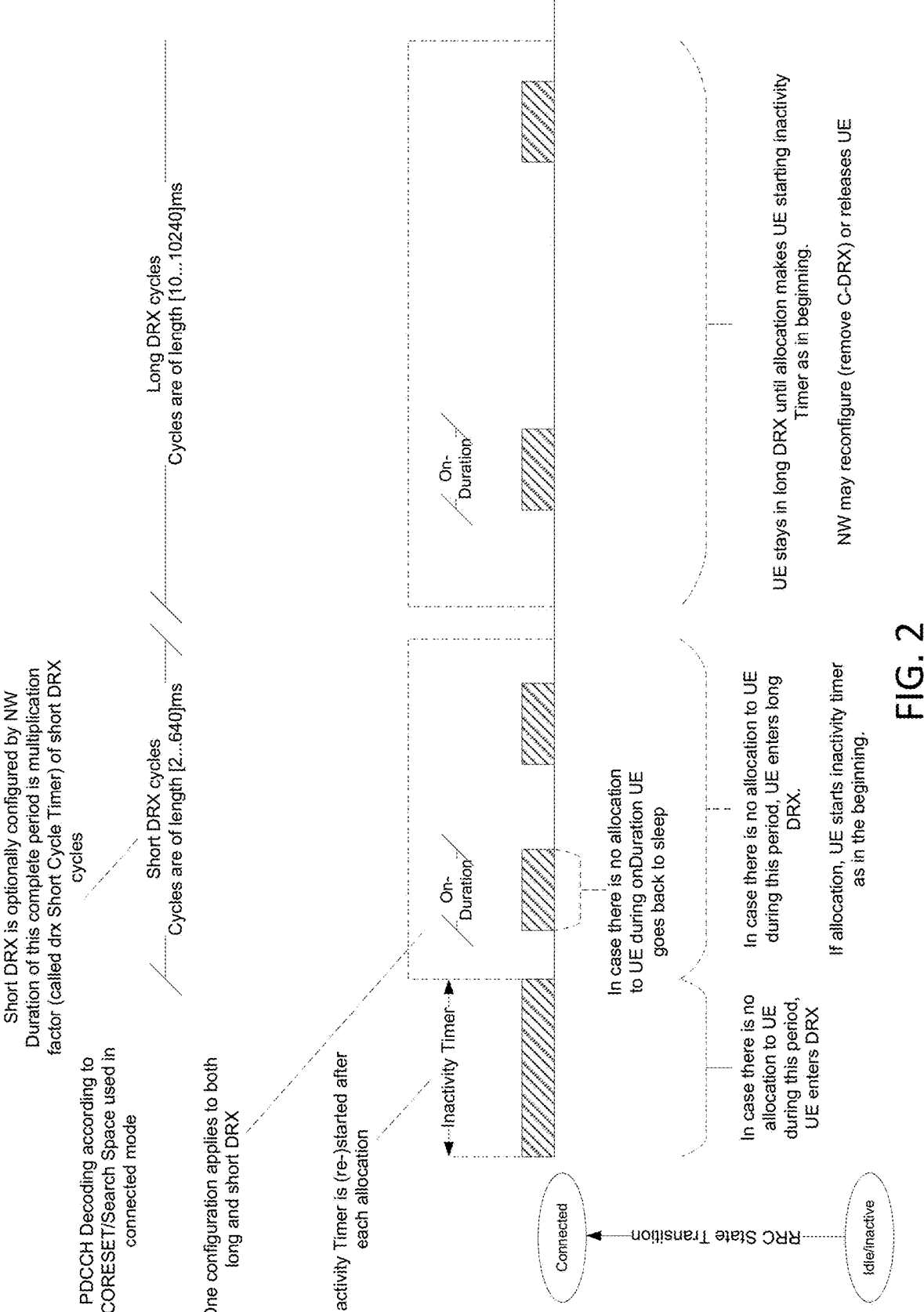
FIG. 2 is a timing diagram of Connected-DRX (C-DRX) operation in 3GPP.
Figure 3:
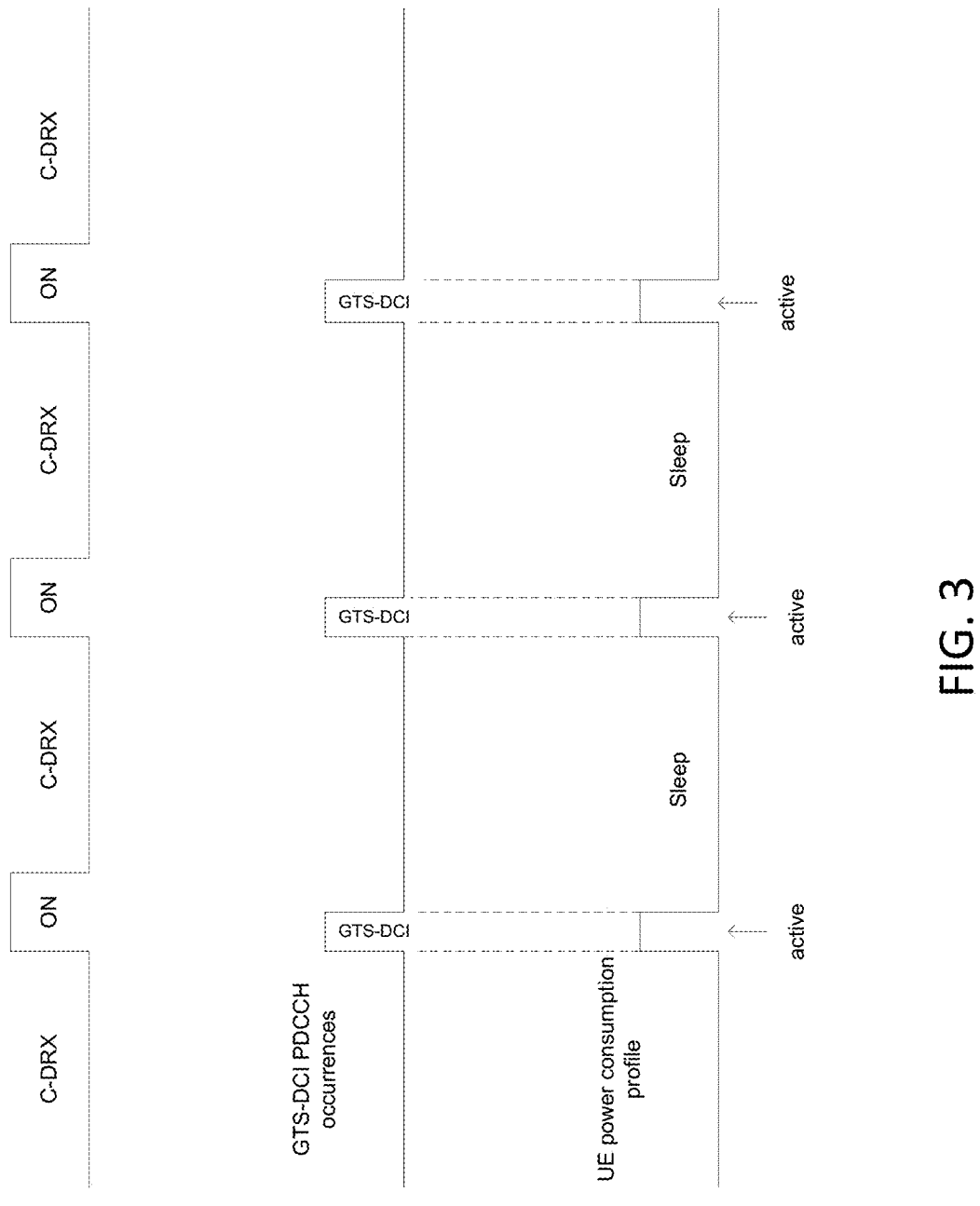
FIG. 3 is a diagram of a schematic description of GTS-DCI mechanism for wireless device power savings.

In a first example, a GTS-DCI mechanism is provided to put the wireless device into sleep mode (also referred to as a non-active mode) during the ON duration of the DRX mechanism, if it turns out that no DL or UL is scheduled for the wireless device, or planned to be scheduled over the rest of the ON duration. FIG. 3 describes this scheme. An advantage is to reduce the number of dummy PDCCH monitoring instances and thereby achieve energy savings in the wireless device.

The time diagram in FIG. 3 shows how the GTS-DCI disrupts the ON duration to avoid the wireless device monitoring of the dummy PDCCH. In this manner, the wireless device may save some of its energy leading to a longer lifetime.

Before describing in detail further exemplary embodiments, it is noted that the embodiments reside primarily in combinations of apparatus components and processing steps related to indicating go-to-sleep (GTS) signaling and/or wake-up signaling (WUS) to the wireless device.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating GTS and/or WUS, for example. A terminal may be configured with and/or for scheduling data and/or to use, e.g., for transmission, scheduled and/or allocated uplink resources, and/or, e.g., for reception, scheduled and/or allocated downlink resources, and/or to enter a mode/state such as GTS or WUS. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide indicating go-to-sleep (GTS) signaling and/or wake-up signaling (WUS) to the wireless device.

Figure 4:
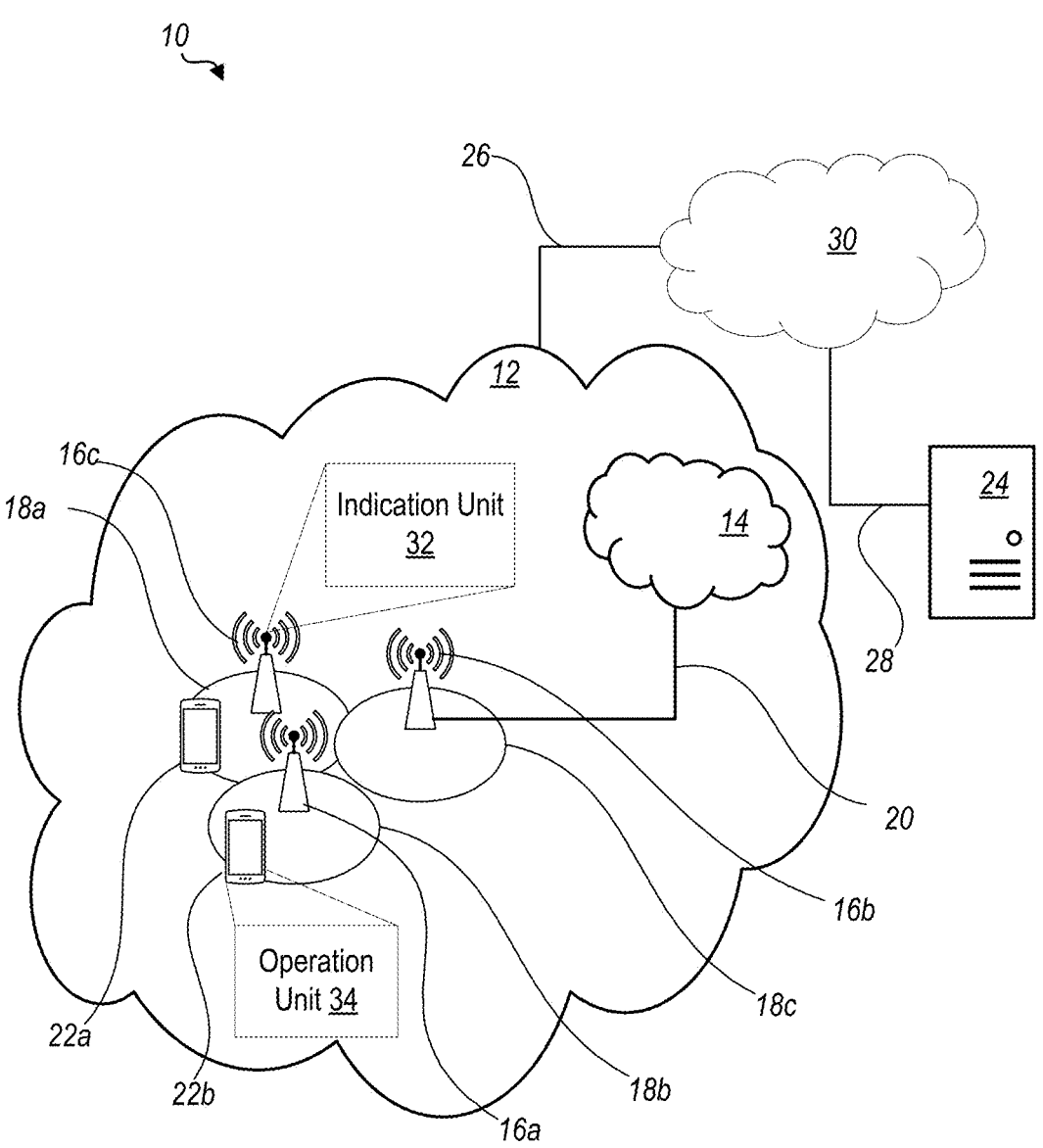
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to indicate go-to-sleep (GTS) signaling and/or wake-up signaling (WUS) to the wireless device 22. A wireless device 22 is configured to include an operation unit 34 which is configured to cause the wireless device 22 to operate according to the indication.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to receive, process, determine, transmit, forward, relay, etc. information related to the one or more indications described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to indicate go-to-sleep (GTS) signaling and/or wake-up signaling (WUS) to the wireless device 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an operation unit 34 configured to operate and/or cause the wireless device 22 to operate according to one or more indications described herein.

Figure 5:
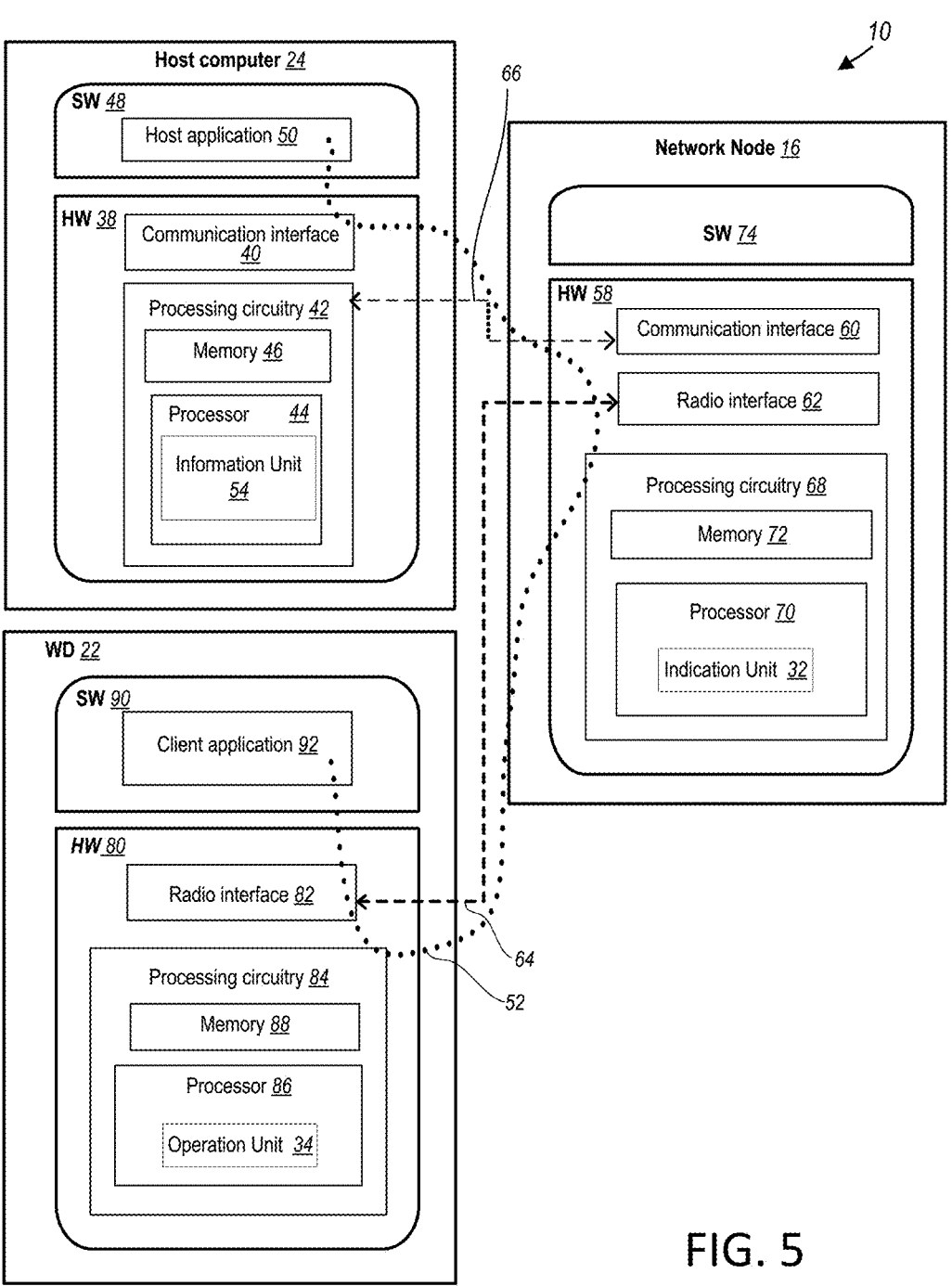
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as indication unit 32, and operation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 10 is a flowchart of an exemplary process in a network node 16 according to one or more embodiments of the disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 such as via one or more of processing circuitry 68, processor 70 and radio interface 62 is configured to indicate (Block S134) at least one of go-to-sleep (GTS) signaling and wake-up signaling (WUS) to the wireless device 22 where the indication of the at least one of GTS signaling and WUS signaling is associated with at least one ON duration of the wireless device 22. In one or more embodiments, "ON duration" may refer to a duration during which the wireless device 22 at least monitors for transmissions from the network node 16.

According to one or more embodiments, the indication of the at least one of GTS signaling and WUS signaling is based at least in part on at least one criterion where the at least one criterion includes at least one of a data traffic pattern of the wireless device 22, status of a downlink buffer and status of channel state information measurement. According to one or more embodiments, the indication of the at least one of GTS signaling and WUS signaling correspond to at least one of: GTS signal, WUS signaling, a lack of WUS signaling to indicate GTS signaling, and a lack of GTS signaling to indicate WUS signaling.

FIG. 11 is a flowchart of an exemplary process in a wireless device 22 according to one or more embodiments of the present disclosure. One or more Blocks and/or functions performed by wireless device 22 may be performed by one or more elements of wireless device 22 such as by operation unit 34 in processing circuitry 84, processor 86, radio interface 82, etc. In one or more embodiments, wireless device 22 such as via one or more of processing circuitry 84, processor 86 and radio interface 82 is configured to operate (Block S136) according to an indication of at least one of go-to-sleep (GTS) signaling and wake-up signaling (WUS) where the indication of the at least one of GTS signaling and WUS signaling being associated with at least one ON duration of the wireless device 22.

According to one or more embodiments, the indication of the at least one of GTS signaling and WUS signaling is based at least in part on at least one criterion where the at least one criterion includes at least one of a data traffic pattern of the wireless device 22, status of a downlink buffer and status of channel state information measurement. According to one or more embodiments, the indication of the at least one of GTS signaling and WUS signaling correspond to at least one of: GTS signal, WUS signaling, a lack of WUS signaling to indicate GTS signaling, and a lack of GTS signaling to indicate WUS signaling.

Having generally described arrangements for signaling control information for indicating go-to-sleep (GTS) signaling and/or wake-up signaling (WUS) to the wireless device 22, details for these arrangements, functions and processes are provided as follows, and which may be implemented by the network node 16, wireless device 22 and/or host computer 24.

Embodiments provide indicating go-to-sleep (GTS) signaling and/or wake-up signaling (WUS) to the wireless device. Some embodiments regarding configuration and monitoring of power saving signal or signal of saving power are presented. A power saving signal can be used as an indicator to trigger a power saving event, e.g., wake-up-signal (WUS), go-to-sleep (GTS), activate or deactivate a BWP, activate or deactivate an antenna, etc. As used herein, "power saving signal" may correspond to WUS and/or GTS, particularly, the PDCCH based signals, namely WUS-DCI and GTS-DCI.

General Framework

At least one scenario is provided where the wireless device 22 is configured with some power saving signal resources and power saving signal monitoring occasions. Particularly, if these resources and/or occasions are PDCCH based, the resources can be some control resource set (CORESETS)/search spaces (SSs) preconfigured for the wireless device 22 by the network node 16 and/or network.

In cases where the wireless device 22 is configured with DRX, some power saving signal monitoring occasions are configured before or in the beginning of the ON duration. In this disclosure, the notion of "before the ON duration" also includes the case of the beginning of the ON duration.

The monitoring occasions can either be configured before every ON duration, or before some ON durations either in a periodic or aperiodic fashion. This configuration of the monitoring occasions can be performed through radio resource control (RRC) signaling, and in case faster adaptation is needed, Medium Access Control (MAC) Control Element (CE) or downlink control information (DCI) signaling can also be employed.

As mentioned above, the power saving signal may include either a WUS or a GTS. WUS is a signal upon whose detection, the wireless device 22 wakes up (that is, transitions from non-active to active mode), ready to receive scheduling DCIs or directly starts receiving or transmitting data over physical downlink shared channel (PDSCH)/physical uplink shared channel (PUSCH)/physical uplink control channel (PUCCH) if it is indicated so.

On the other hand, GTS is a signal upon whose detection the wireless device 22 goes to sleep (that is, enters a non-active mode) either immediately or based on commands provided as part of the GTS, meaning that no data reception or transmission will not be performed during a certain time interval.

Depending on the maximum number of power saving signals the network and/or network node 16 sends/transmits/signals in a power saving signal occasion, several power saving monitoring occasions in a row in time or frequency, or a combination of both can be considered. For example, in one or more embodiments, one specific monitoring occasion can be considered for WUS, and one specific monitoring occasion can be considered for GTS, or several WUSs and several GTSs. In another approach, WUS(s) and GTS(s) share the same monitoring occasion(s). In some embodiments, the wireless device 22 is preconfigured to detect only WUS, and the lack of a received WUS implies and/or indicates a GTS, or the wireless device 22 is preconfigured to detect only GTS, and the lack of a received GTS implies and/or indicates a WUS.

Below are some specific examples of this general framework. As used herein, GTS may refer to GTS signaling and/or an indication of GTS/GTS signaling, while WUS may refer to WUS signaling and/or an indication of WUS/WUS signaling.

Example 1: GTS Before ON Duration

In one or more embodiments, the power saving signal is a GTS, e.g., a PDCCH based GTS which is sent and/or transmitted and/or signaled before the ON duration of the wireless device 22 defined by the wireless device 22's C-DRX configuration (i.e., when the wireless device is in sleep mode, or the non-active mode). After the detection of the GTS by the wireless device 22, the wireless device 22 can skip the upcoming ON duration, i.e. continue in sleep mode during the upcoming ON duration. Put another way, the wireless device 22 continues in sleep/non-active mode during an active mode time scheduled, or defined, by the C-DRX configuration. This can avoid the situation where the wireless device transitions to an active mode to then discover that monitoring the PDCCH is not required for that ON duration before then transitioning back to a non-active mode, for example as illustrated in FIG. 3. Thus, unnecessary transitions to an active mode can be avoided, leading to further power saving at the wireless device.

In one or more examples, the network and/or network node 16 can configure, such as via processing circuitry 68, the wireless device 22 to skip N (multiple) upcoming ON durations. Such a configuration can be pre-configured by the network node 16 and/or network, e.g. through RRC/MAC CE mechanisms, or dynamically be indicated using DCI signaling (e.g., in the current GTS).

In one or more examples, the network node 16 and/or network can configure such as via processing circuitry 68 the wireless device 22 to skip N out of M upcoming ON durations with a pre-configured pattern (e.g., through RRC), or a dynamic pattern (e.g. informed through MAC CE or DCI signaling).

In one or more examples, particularly regarding the DCI based GTS (denoted by GTS-DCI), the GTS includes additional commands which among other things/data/information can include how long and/or duration the wireless device 22 has to sleep for, the sleeping pattern (e.g. which ON durations should be skipped), overriding the GTS and possibly WUS configurations, or direct indication to the first expected PDSCH. An example GTS-DCI payload as shown in FIG. 12 can contain a bit or a bit field 1201 indicating this is a GTS-DCI where the rest or a portion of the remaining GTS-DCI payload (denoted 1203) can be used for providing one or more additional commands. The DCI itself can be designed either to be included in the current DCI formats, e.g. 0-1 or as a new DCI.

As in the case of WUSs, in case of the GTS, the two factors that might be relevant in choosing the GTS signal are the missed detection and false alarm rates. Missed detection of a GTS signal may lead to the wireless device 22 being awake for a duration over which the wireless device 22 could have been sleeping (i.e., in sleep mode or in a power saving mode or non-active mode) and thus waste some power. A false alarm may lead the wireless device 22 to be sleeping (i.e., in sleep mode and/or in a power saving mode or non-active mode) while the network and/or network node 16 expects or plans to schedule, e.g., a PDSCH, for the wireless device 22. So opposite to the case of the WUS, it may be desirable to focus on a low false alarm rate, since a false alarm leads to a waste of resources at the network node 16 and/or network and further additional latency. Therefore, it may be important to design the GTS to deliver a very low false alarm rate while also a low miss detection to save power.

A summary of the embodiments for Example 1 are shown in FIGS. 15 and 16. FIG. 15 is a flowchart of method steps performed at wireless device 22. At S138, the WD 22 receives an indication of a GTS signal. The GTS signal is received when the WD is in non-active mode, or a power saving mode. Thus, it's received prior to an upcoming active time mode, or ON duration. The GTS signal indicates to the WD to stay in the non-active mode during the upcoming active mode. In other words, the GTS signal indicates to the WD 22 to stay outside its active mode during the upcoming active mode time/ON duration. As described above, the GTS signal can in some examples be received over PDCCH, for example in DCI. FIG. 16 shows the corresponding method steps performed at the network node 16. At step 140, the network node indicates a GTS signal to the WD 22 when the WD is in a non-active mode, or power saving mode. In other words, it's indicated to the WD 22 prior to an upcoming active time mode, or ON duration. The GTS signal indicates the WD is to stay in its non-active mode during the upcoming ON duration.

Example 2: Joint WUS and GTS Mechanism for One or More ON Durations

In Example 2a, a joint WUS and GTS mechanism is considered, where the network and/or network node 16 can decide/determine to send a WUS (monitor for scheduling PDCCH) before the ON duration, and then a GTS during the ON duration to cut the ON duration, and thereby saving power in the wireless device, or vice versa (the GTS causing the device to not monitor for scheduling PDCCH, and only monitor for WUSs). FIG. 13 illustrates Example 2a. In other words, the wireless device receives the WUS 1301 when it's in the non-active (or sleep, or low-power) mode, and receives the GTS signal 1303 when in the active mode. In this example, the WUS and GTS signal are sent for a single ON duration, i.e. a single active mode time. That is, the WUS is received before the ON duration/active mode time 1305 to cause the device to transition to its active mode, and the GTS is received during the ON duration/active mode time to cause the wireless device to transition back to the non-active mode during the active mode time.

In an example, the network node 16 and/or network plans to schedule a wireless device 22 in the upcoming ON duration, where the network node 16 can send, such as via processing circuitry 68 and/or communicate interface 60 and/or radio interface 62, a WUS to wake-up the wireless device 22. Then, when the delivery of information is finished, and, e.g., the UE DL buffer as well as its BSR are empty, the network node 16 can send a GTS signal to put the wireless device 22 to sleep. Here, either a GTS-DCI or MAC CE DRX command or extension of it (particularly if additional commands are needed), can be sent as GTS. The network node 16 can use this GTS to override the current WUS/GTS configurations or leave them as it is.

In one or more embodiments, the network node 16 can, such as via processing circuitry 68 and/or communicate interface 60 and/or radio interface 62, wake up the wireless device 22 for N numbers of upcoming ON durations, or N out of M ones according to a pre-defined or dynamic pattern (i.e., criterion), and then use GTS to put the wireless device 22 to sleep if nothing is scheduled or planned to be scheduled for the wireless device 22, i.e., use GTS based on at least one criterion. If the GTS happens to be in any of these ON durations, the network node 16 can either override the current WUS/GTS configuration, or let the wireless device 22 sleep until the end of the current configuration, or just skip the current ON duration and then again, the wake-up pattern remains the same for the rest. Such (re)configurations can be pre-configured by RRC signaling, or MAC CE, or clearly included in the GTS-DCI.

The opposite embodiment to the embodiment described above is when the network node 16 notices and/or determines and/or receives an indication that the wireless device 22 buffer is empty (i.e., at least one criterion), the network node 16 can send a GTS before an upcoming ON duration/active mode time to skip the event (i.e., cause the device to stay in its non-active or power saving mode during the ON duration/active mode time). Nevertheless, in case some eminent information comes up for transmission to the wireless device 22, the network node 16 can send a WUS to wake the wireless device 22 up. In this case, the wireless device 22 should be configured in advance either through RRC signaling, or through other dynamic means, e.g., the command in the GTS-DCI to monitor the WUS in some WUS occasions either periodically or aperiodic. In case the network node 16 decides/determines to send a WUS, e.g., a WUS-DCI, then if the network node 16 uses this to change the current WUS/GTS. In summary, in this alternative embodiment the wireless device 22 receives the GTS before an upcoming active mode time and then a WUS during the active mode time/ON duration, the WUS causing the wireless device to transition out of its non-active mode to its active mode during the active mode time.

A summary of the embodiments for Example 2a are illustrated in FIGS. 17 and 18. FIG. 17 shows the steps performed by the wireless device 22. At step S142, the wireless device 22 receives an indication of a WUS when it's in non-active mode, or power-saving mode. The indication of the WUS is therefore received prior to an active mode time, i.e. before an upcoming ON duration. The WUS indicates to the wireless device to transition to its active mode. At S144, the wireless device 22 receives an indication of a GTS signal over PDCCH when the device is in its active mode. In other words, the GTS signal is received during the active mode time, or ON duration. The GTS signal indicates to the wireless device 22 to transition from its active mode to is non-active, or power saving, mode during the active mode time. Upon receiving the GTS signal, the wireless device 22 transitions out of the active mode during the active mode time. The WUS and/or the GTS signal can be received from the network node 16 or from the network, NW.

The corresponding method steps performed by the wireless device 22 are shown in FIG. 18. At S146, the network node 16 indicates a WUS to the wireless device when the wireless device is in its non-active mode. Thus, the WUS is indicated to the wireless device 22 prior to an active mode time defined by the wireless device's C-DRX configuration. The WUS indicates to the wireless device 22 to transition to an active mode. At step S148, the network node 16 indicates a GTS signal over PDCCH to the wireless device 22 during the active mode time. Thus, the GTS signal is indicated to the wireless device 22 when the device is in active mode. The GTS signal indicates to the wireless device 22 to transition to non-active mode during the active mode time.

In another example 2b, the network node 16 can, such as via processing circuitry 68 and/or communicate interface 60 and/or radio interface 62, put the wireless device 22 to sleep using a GTS for N numbers of upcoming ON durations, or N out of M ones according to a pre-defined or dynamic pattern (i.e., at least one criterion for using GTS), and then use WUS to wake up the wireless device 22 if something is expected to be scheduled or planned to be scheduled (i.e., at least one criterion for using WUS). Again, the wireless device 22 may be configured in advance either through RRC signaling, or through other dynamic means, e.g. the command in the GTS-DCI to monitor the WUS in some WUS occasions either periodically or aperiodic. After having detected a GTS, the wireless device 22 may only be monitoring for WUS. The absence of a received WUS may be interpreted as the GTS command still being valid, i.e., the absence of the receive WUS indicates to the wireless device 22 that the GTS command is still valid or put another way a lack of WUS signaling indicates GTS signaling. Symmetrically, after having detected a WUS, the wireless device 22 will be monitoring for scheduling PDCCH or GTS. The absence of a received GTS is an indication to continue monitoring scheduling PDCCH or put another way the lack of GTS signaling indicates WUS signaling. FIG. 14 illustrates an example 2b. The WUS is illustrated at 1401 and the GTS signal at 1403. The plurality of ON durations, or active mode times, are shown generally at 1405.

Furthermore, like the previous example, the WUS, e.g., WUS-DCI can be used to wake up the wireless device 22 just for the current ON duration, or for all the remaining ON durations or some of them, or even override the current WUS/GTS configurations. Such (re)configurations can be pre-configured by RRC signaling, or MAC CE, or included in the WUS-DCI, for example.

In some examples, a WUS is sent before every or a number of PDCCH monitoring occasions and a GTS signal sent when the current reception/transmission is over. This is a more 'aggressive' approach.

For a certain wireless device 22, the network node 16 may schedule, such as via processing circuitry 68 and/or communicate interface 60 and/or radio interface 62, the GTS and WUS signals according to the coming data traffic pattern of the wireless device 22 (i.e., the data traffic pattern may be at least one criterion for use of GTS and/or WUS). For example, after the current reception/transmission is over, GTS may be sent when the time interval to the next PDCCH is longer than a threshold (which corresponds to the wireless device 22's wakeup ramping-up and going-to-sleep ramp-down duration). This can avoid additional switching by the wireless device 22 between sleep and wakeup that may occur too often in a short period.

Example 3: WUS/GTS Resources

The network node 16 has several ways to assign resources for WUS/GTS. Below WUS/GTS resources for PDCCH based WUS/GTS, namely WUS-DCI and GTS-DCI are described. However, similar procedures can be applied to other types of WUS/GTS, example sequence-based ones.

In one or more embodiments, the network node 16 can define separate CORESETs/search spaces (SSs) for WUS and GTS signals. The resources can be additionally specific to WUS and GTS, e.g., a WUS-CORESET/SS or a GTS-CORESET/SS. In this case, if the DCI happens to fall in specific GTS-CORESETs/SSs, then it is considered by the wireless device as a GTS-DCI, and if it falls in WUS-CORESETs/SSs, then it is considered by the wireless device as a WUS-DCI. These CORESETs/SSs can be the same as the ones for normal PDCCH monitoring or defined additionally for the specific purpose of the WUS/GTS.

In one or more embodiments, the network nodes 16 can configure, such as via processing circuitry 68 and/or communicate interface 60 and/or radio interface 62, the WUS and GTS to be monitored in the same CORESETs/SSs. In this case, the DCI sent for WUS or GTS may need to be different from each other, so the wireless device 22 can distinguish the DCIs. For example, a bit or bit field can indicate that this is a WUS or GTS. Alternatively, for example, a specific function of C-RNTI can indicate this is a WUS, while its inverse may indicate GTS or vice-versa. In one embodiment, the network node 16 may use the same transmitted signal for both and the wireless device 22 determines whether a received signal is a WUS or a GTS based on the most recent previously received signal-a toggle function.

It is noted the embodiments of Example 3 can be readily combined with the embodiments of Examples 1, 2a, 2b and 4. For example, the WUS and/or GTS signal can be communicated to the wireless device 22 in accordance with the embodiments of Examples 1, 2a, 2b and 4 in resources assigned in accordance with the embodiments of Example 3. Similarly, the wireless device 22 can monitor the resources assigned in accordance with the embodiments of Example 3 for the WUS and/or GTS communicated in accordance with the embodiments of Examples 1, 2a, 2b and 4.

A summary of the embodiments for Example 3 are shown in FIG. 19, which shows steps performed by wireless device 22. At step S150, the wireless device receives an assignment of at one CORESET. The at least one CORESET could be assigned from the network node 16, or the network more generally. The CORESET is associated with at least one search space to monitor for an indication of a power-saving signal outside active mode. Thus, the wireless device 22 receives an assignment of a CORESET associated with at least one search space the device 22 is to monitor outside active mode—i.e., when the device is in non-active or power-saving mode—for an indication of a power-saving signal. The power saving signal could be a GTS signal or WUS. Upon receiving the assignment, the wireless device monitors the associated search space for the power-saving signal.

FIG. 20 shows the corresponding flowchart of method steps performed by network node 16. At step S152, the network node 16 configures the wireless device with at least one CORESET that is associated with at least one search space the wireless device 22 is to monitor for an indication of a power-saving signal outside active mode (i.e., when the device is in the non-active or power-saving mode). The power saving signal could be a GTS signal or a WUS.

Example 4: Network Node 16 Decision Making to Send a GTS or WUS Before ON Duration In one or more embodiments, the procedure that the network node 16 can follow to determine if the network node 16 may send a WUS or GTS before the ON duration is described. Particularly, the appropriate time for the network node 16 to send a GTS instead of lack of WUS, or vice versa, to send a WUS instead of lack of GTS, is described.

In one example, the network node 16 decides, such as via processing circuitry 68 and/or communicate interface 60 and/or radio interface 62, to send the signal that may need to be sent less often, given the traffic patterns (i.e., criterion) to the wireless device 22. If the wireless device 22 is receiving data often, occasional GTS transmission when no data is available reduces network node 16 resource usage for power saving signaling. Conversely, if the wireless device 22 receives data rarely, configuring the wireless device 22 to look for a WUS may be preferable. The choice between WUS or GTS may also be based on the network node 16 load (i.e., criterion), e.g., if there is no resource limitation, the more robust GTS may always be selected, such as PDCCH-GTS, for which false alarm probability may be kept low. If there is a resource shortage, the above choice between WUS and GTS may be made.

In one or more embodiments, the network node 16 can decide, such as via processing circuitry 68 and/or communicate interface 60 and/or radio interface 62, to send a WUS if the DL buffer of the wireless device is not empty, or if the wireless device 22 is expected to send an updated CSI measurement (particularly an aperiodic one), or if the network node 16 expects some data to be coming for the upcoming ON duration or in a number of upcoming ON durations. To do so, the network node 16 can for example look at the previous wireless device 22 statistics to learn the pattern of wireless device 22 data delivery (i.e., criterion). For example, if based on the current statics, the probability that some DL data becomes available for the wireless device 22 is more than a threshold, the network node 16 sends a WUS, and if less, it does not send a WUS.

One or more embodiments can also be provided for GTS. For example, if the wireless device 22 DL buffer is empty (i.e., criterion), the network node 16 may decide to send a GTS, letting the wireless device 22 go to sleep in the next ON duration(s), or the network node 16 can also make this decision based on the previous data delivery pattern of the wireless device 22 and the associated probabilities.

In some embodiments, when the wireless device 22 is configured to monitor, such as using processing circuitry 84, for both WUS and GTS simultaneously, when the network node 16 decides to send a WUS, the network node 16 can also decide to not send a GTS, or when the network node 16 decides to send a GTS, the network node 16 can also decide to not send a WUS. This may lead to misalignment in case the wireless device 22 is configured to monitor both WUS and GTS in a single occasion. For example, if the wireless device 22 is supposed to receive a GTS and correctly detects it, but also triggers a WUS false alarm, a misalignment can occur as the wireless device 22 does not know to sleep or remains awake.

One solution to the above misalignment is that based on the channel measurements either obtained by the network node 16 or reported by the wireless device 22, the network node 16 decides that for a number of occasions to use only GTS or WUS and communicates this to the wireless device 22, either through RRC signaling, MAC CE or DCI, where misalignment may be considered a criterion for using WUS and/or GTS. However, RRC signaling in this case may be more appropriate as the configuration may remain the same over a longer period. For example, when one or more channel conditions are good (i.e., one or more calculated and/or measured metrics of the channel meet one or more predefined thresholds and/or criterion), and thus the WUS can be reliably detected, the network node 16 may decide to use WUS as the indication and in this case lack of WUS may indicate the GTS. But if the channel conditions are not good (i.e., do not meet a threshold and/or criterion), the network node 16 may decide to use GTS which may provide a low false alarm and thus less risk to the network node 16.

Another solution to the misalignment described above, particularly if the network node 16 does not make each occasion specific to WUS or GTS and expects the wireless device 22 to monitor both, is that the wireless device 22 remains awake in case of conflict between the GTS and WUS indication.

Here, the possibility of joint WUS/GTS provides another level of robustness in case of error or misalignment. For example, if the wireless device 22 by mistake goes to sleep, the network node 16 can become aware of this as soon as it does not receive a HARQ ACK/NACK and thus try to awaken the wireless device 22 using a WUS.

Therefore, as described herein, the disclosure provides the wireless device 22 with efficient mechanisms to save power while keeping network node 16 in charge to help ensure the network performance is not impacted. Provision of a GTS may help the wireless device 22 to more reliably keep sleeping and thus save additional energy. Suitable selection of WUS vs GTS configurations allows for invoking of a favorable trade-off between wireless device 22 power saving, power saving signal detection performance, and network node 16 resource utilization.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

3GPP 3rd Generation Partnership Project
5G 5th Generation
BB Baseband
BW Bandwidth
C-DRX/CDRX Connected mode DRX (i.e. DRX in RRC-_CONNECTED state)
CRC Cyclic Redundancy Check
DCI Downlink Control Information
DL Downlink
DRX Discontinuous Reception
gNB A radio base station in 5G/NR.
GTS Go to sleep
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Example embodiments according to the present disclosure are presented below.

Embodiments

Embodiment A1. A network node configured to communicate with a wireless device (WD), the network node configured to, and/or comprising a radio interface and/or comprising processing circuitry configured to:
    indicate at least one of go-to-sleep (GTS) signaling and wake-up signaling (WUS) to the wireless device, the indication of the at least one of GTS signaling and WUS signaling being associated with at least one ON duration of the wireless device.

Embodiment A2. The network node of Embodiment A1, wherein the indication of the at least one of GTS signaling and WUS signaling is based at least in part on at least one criterion, the at least one criterion including at least one of a data traffic pattern of the wireless device, status of a downlink buffer and status of channel state information measurement.
Embodiment A3. The network node of Embodiment A1, wherein the indication of the at least one of GTS signaling and WUS signaling correspond to at least one of:
    GTS signal;
    WUS signaling;
    a lack of WUS signaling to indicate GTS signaling; and
    a lack of GTS signaling to indicate WUS signaling.
Embodiment B1. A method implemented in a network node that is configured to communicate with a wireless device, the method comprising indicating at least one of go-to-sleep (GTS) signaling and wake-up signaling (WUS) to the wireless device, the indication of the at least one of GTS signaling and WUS signaling being associated with at least one ON duration of the wireless device.
Embodiment B2. The method of Embodiment B1, wherein the indication of the at least one of GTS signaling and WUS signaling is based at least in part on at least one criterion, the at least one criterion including at least one of a data traffic pattern of the wireless device, status of a downlink buffer and status of channel state information measurement.
Embodiment B3. The method of Embodiment B1, wherein the indication of the at least one of GTS signaling and WUS signaling correspond to at least one of:
    GTS signal;
    WUS signaling;
    a lack of WUS signaling to indicate GTS signaling; and
    a lack of GTS signaling to indicate WUS signaling.
Embodiment C1. A wireless device (WD) configured to communicate with a network node, the WD configured to, and/or comprising a radio interface and/or processing circuitry configured to:
    operate according to an indication of at least one of go-to-sleep (GTS) signaling and wake-up signaling (WUS), the indication of the at least one of GTS signaling and WUS signaling being associated with at least one ON duration of the wireless device.
Embodiment C2. The WD of Embodiment C1, wherein the indication of the at least one of GTS signaling and WUS signaling is based at least in part on at least one criterion, the at least one criterion including at least one of a data traffic pattern of the wireless device, status of a downlink buffer and status of channel state information measurement.
Embodiment C3. The WD of Embodiment C1, wherein the indication of the at least one of GTS signaling and WUS signaling correspond to at least one of:
    GTS signal;
    WUS signaling;
    a lack of WUS signaling to indicate GTS signaling; and
    a lack of GTS signaling to indicate WUS signaling.
Embodiment D1. A method implemented in a wireless device (WD), the method comprising operating according to an indication of at least one of go-to-sleep (GTS) signaling and wake-up signaling (WUS), the indication of the at least one of GTS signaling and WUS signaling being associated with at least one ON duration of the wireless device.

Embodiment D2. The method of Embodiment D1, wherein the indication of the at least one of GTS signaling and WUS signaling is based at least in part on at least one criterion, the at least one criterion including at least one of a data traffic pattern of the wireless device, status of a downlink buffer and status of channel state information measurement.

Embodiment D3. The method of Embodiment D1, wherein the indication of the at least one of GTS signaling and WUS signaling correspond to at least one of:

GTS signal;

WUS signaling;

a lack of WUS signaling to indicate GTS signaling; and a lack of GTS signaling to indicate WUS signaling.

The invention claimed is:

1. A method for a wireless device configured with a connected discontinuous reception, C-DRX, mode defining an active mode and a non-active mode, the active mode defining a plurality of on-durations, the non-active mode defining a plurality of off-durations, the method comprising:

receiving an assignment of at least one control resource set, CORESET, associated with at least one search space to monitor for a power-saving signal outside the active mode, the power saving signal being a go-to-sleep, GTS, signal indicating to the wireless device to stay outside the active mode during an upcoming active mode time defined by the wireless device's C-DRX configuration or a wake-up signal, WUS, indicating to the wireless device to transition to the active mode from the non-active mode, the power saving signal being received in a downlink control information, DCI, the at least one CORESET being the same CORESET regardless of whether the power signal is the GTS signal or the WUS;

monitoring the at least one CORESET for the power saving signal;

receiving a first DCI comprising the power saving signal in the at least one CORESET before a first on-duration of the plurality of on-durations;

determining that the power saving signal in the first DCI is the WUS based on a single bit in the first DCI, the single bit indicating whether the power saving signal is the WUS or the GTS signal;

operating the wireless device in active mode in response to receiving the first DCI;

receiving a second DCI comprising the power saving signal in the at least one CORESET subsequent to the first on-duration of the plurality of on-durations;

determining that the power saving signal in the second DCI is the GTS signal based on a single bit in the second DCI, the single bit indicating whether the power saving signal is the WUS or the GTS signal; and operating the wireless device in the non-active mode in response to receiving the second DCI.

2. The method of claim 1, wherein the wireless device operates according to the GTS signal by staying in the non-active mode during the upcoming active mode time.

3. The method of claim 1, wherein the wireless device operates according to the wake-up signal by transitioning to the active mode from the non-active mode.

4. The method of claim 1, wherein the power saving signal is received over a physical downlink channel, PDCCH.

5. The method of claim 1, wherein the at least one CORESET is a CORESET specific to the power-saving signal.

6. The method of claim 1, wherein the at least one CORESET is shared for other physical downlink channel, PDCCH, monitoring.

7. A wireless device configured with a connected discontinuous reception, C-DRX, mode defining an active mode and a non-active mode, the active mode defining a plurality of on-durations, the non-active mode defining a plurality of off-durations, the wireless device having processing circuitry configured to:

receive an assignment of at least one control resource set, CORESET, associated with at least one search space to monitor for a power-saving signal outside the active mode, the power saving signal being a go-to-sleep, GTS, signal indicating to the wireless device to stay outside the active mode during an upcoming active mode time defined by the wireless device's C-DRX configuration or a wake-up signal, WUS, indicating to the wireless device to transition to the active mode from the non-active mode, the power saving signal being received in a downlink control information, DCI, the at least one CORESET being the same CORESET regardless of whether the power signal is the GTS signal or the WUS;

monitor the at least one CORESET for the power saving signal;

receive a first DCI comprising the power saving signal in the at least one CORESET before a first on-duration of the plurality of on-durations;

determine that the power saving signal in the first DCI is the WUS based on a single bit in the first DCI, the single bit indicating whether the power saving signal is the WUS or the GTS signal;

operate the wireless device in active mode in response to receiving the first DCI;

receive a second DCI comprising the power saving signal in the at least one CORESET subsequent to the first on-duration of the plurality of on-durations;

determine that the power saving signal in the second DCI is the GTS signal based on a single bit in the second DCI, the single bit indicating whether the power saving signal is the WUS or the GTS signal; and operate the wireless device in the non-active mode in response to receiving the second DCI.

8. The wireless device of claim 7, wherein the wireless device operates according to the GTS signal by staying in the non-active mode during the upcoming active mode time.

9. The wireless device of claim 7, wherein the wireless device operates according to the wake-up signal by transitioning to the active mode from the non-active mode.

10. The wireless device of claim 7, wherein the power saving signal is received over a physical downlink channel, PDCCH.

11. A method implemented at a network node configured to communicate with a wireless device configured with a connected discontinuous reception, C-DRX, mode defining an active mode and a non-active mode, the active mode defining a plurality of on-durations, the non-active mode defining a plurality of off-durations, the method comprising:

configuring the wireless device with at least one control resource set, CORESET, associated with at least one search space to monitor for a power-saving signal outside the active mode, the power saving signal being a go-to-sleep, GTS, signal indicating to the wireless device to stay outside the active mode during an upcoming active mode time defined by the wireless device's C-DRX configuration or a wake-up signal, WUS, indicating to the wireless device to transition to the active mode from the non-active mode, the power saving signal is to be transmitted in a downlink control information, DCI, the at least one CORESET being the same CORESET regardless of whether the power signal is the GTS signal or the WUS; and transmitting a first DCI comprising the power saving signal in the at least one CORESET before a first on-duration of the plurality of on-durations, the first DCI comprising a single bit indicating that the power saving signal is the WUS for the wireless device to operate in active mode in response to the first DCI;

transmitting a second DCI comprising a power saving signal in the at least one CORESET subsequent to the first on-duration of the plurality of on-durations, the second DCI comprising a single bit indicating whether the power saving signal is the WUS or the GTS signal, the power saving signal being the GTS signal for the wireless device to operate in the non-active mode in response to the second DCI.

12. The method of claim 11, wherein the WUS is configured to trigger the wireless device to transition to the active mode from the non-active mode.

13. The method of claim 11, wherein the power saving signal is received over a physical downlink channel, PDCCH.

14. A network node configured to communicate with a wireless device configured with a connected discontinuous reception, C-DRX, mode defining an active mode and a non-active mode, the active mode defining a plurality of on-durations, the non-active mode defining a plurality of off-durations, the network node having processing circuitry configured to:

assign to the wireless device at least one control resource set, CORESET, associated with at least one search space to monitor for a power-saving signal outside the active mode, the power saving signal being a go-to-sleep, GTS, signal indicating to the wireless device to stay outside the active mode during an upcoming active mode time defined by the wireless device's C-DRX configuration or a wake-up signal, WUS, indicating to the wireless device to transition to the active mode from the non-active mode, the power saving signal is to be transmitted in a downlink control information, DCI, the at least one CORESET being the same CORESET regardless of whether the power signal is the GTS signal or the WUS; and transmit a first DCI comprising the power saving signal in the at least one CORESET before a first on-duration of the plurality of on-durations, the first DCI comprising a single bit indicating that the power saving signal is the WUS for the wireless device to operate in active mode in response to the first DCI;

transmitting a second DCI comprising a power saving signal in the at least one CORESET subsequent to the first on-duration of the plurality of on-durations, the second DCI comprising a single bit indicating whether the power saving signal is the WUS or the GTS signal, the power saving signal being the GTS signal for the wireless device to operate in the non-active mode in response to the second DCI.

15. The network node of claim 14, wherein the WUS is configured to trigger the wireless device to transition to the active mode from the non-active mode.

16. The network node of claim 14, wherein the power saving signal is received over a physical downlink channel, PDCCH.

* * * * *